(12) United States Patent  
Zhou et al.

(10) Patent No.: US 12,224,506 B2  
(45) Date of Patent: Feb. 11, 2025

(54) ANTENNA FOR FOLDABLE ELECTRONIC DEVICE AND FOLDABLE ELECTRONIC DEVICE

(71) Applicant: Huawei Technologies Co., Ltd., Shenzhen (CN)

(72) Inventors: Yuan Zhou, Shanghai (CN); Xiaopeng Liu, Shenzhen (CN); Meng Hou, Shanghai (CN); Dong Yu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 90 days.

(21) Appl. No.: 18/044,303

(22) PCT Filed: Aug. 5, 2021

(86) PCT No.: PCT/CN2021/110863  
§ 371 (c)(1),  
(2) Date: Mar. 7, 2023

(87) PCT Pub. No.: WO2022/052690  
PCT Pub. Date: Mar. 17, 2022

(65) Prior Publication Data  
US 2024/0030607 A1  Jan. 25, 2024

(30) Foreign Application Priority Data

Sep. 10, 2020  (CN) .......................... 202010945216.0

(51) Int. Cl.  
*H01Q 9/04* (2006.01)  
*G06F 1/16* (2006.01)  
(Continued)

(52) U.S. Cl.  
CPC ......... *H01Q 9/0421* (2013.01); *G06F 1/1616* (2013.01); *G06F 1/1698* (2013.01);  
(Continued)

(58) Field of Classification Search  
CPC ...... H01Q 9/0421; H01Q 1/2266; H01Q 1/48; H01Q 1/50; H01Q 13/10; H01Q 15/14;  
(Continued)

(56) References Cited

U.S. PATENT DOCUMENTS

2008/0238787 A1\* 10/2008 Lin ...................... H01Q 1/2266  
343/702  
2011/0310572 A1  12/2011 Murakami  
(Continued)

FOREIGN PATENT DOCUMENTS

CN  1773773 A  5/2006  
CN  102544714 A  7/2012  
(Continued)

*Primary Examiner* — Daniel D Chang  
(74) *Attorney, Agent, or Firm* — Slater Matsil, LLP

(57) ABSTRACT

A foldable electronic device includes a first housing and a second housing that are rotationally connected to each other by means of rotating shafts located on two sides, and an antenna. The first housing can switch between an unfolded state and a folded state relative to the second housing, and the antenna is disposed in a closed slot. The antenna includes a first antenna segment and a second antenna segment that are sequentially connected and disposed in a length direction of the antenna. One end of the first antenna segment is connected to a ground plate of the first housing. The first antenna segment extends from one end toward a direction in which an opening/closing region of the first housing and the second housing in the unfolded state is away from the first housing.

20 Claims, 31 Drawing Sheets

(51) Int. Cl.
*H01Q 1/22* (2006.01)
*H01Q 1/48* (2006.01)
*H01Q 1/50* (2006.01)

(52) U.S. Cl.
CPC ............. *H01Q 1/2266* (2013.01); *H01Q 1/48* (2013.01); *H01Q 1/50* (2013.01)

(58) Field of Classification Search
CPC .......... H01Q 1/36; H01Q 1/22; G06F 1/1616; G06F 1/1698
See application file for complete search history.

(56) References Cited

U.S. PATENT DOCUMENTS

| | | | |
|---|---|---|---|
| 2014/0055318 A1 | 2/2014 | Liu et al. | |
| 2017/0212554 A1* | 7/2017 | Guterman | ............. G06F 1/1681 |
| 2018/0090840 A1* | 3/2018 | Yu | ........................ H01Q 21/064 |

FOREIGN PATENT DOCUMENTS

| | | | | |
|---|---|---|---|---|
| CN | 103367867 A | 10/2013 | | |
| CN | 204045734 U | 12/2014 | | |
| CN | 104901015 A | 9/2015 | | |
| CN | 105789823 A | 7/2016 | | |
| CN | 106058429 A | 10/2016 | | |
| CN | 108428994 A | 8/2018 | | |
| CN | 106058429 B | * 3/2019 | ........... G06F 1/1616 |
| CN | 110416707 A | 11/2019 | | |
| CN | 210272673 U | 4/2020 | | |
| WO | 2020168915 A1 | 8/2020 | | |

\* cited by examiner

ANTENNA FOR FOLDABLE ELECTRONIC DEVICE AND FOLDABLE ELECTRONIC DEVICE

CROSS-REFERENCE TO RELATED APPLICATIONS

This application is a National Stage of International Patent Application No. PCT/CN2021/110863, filed on Aug. 5, 2021, which claims priority to Chinese Patent Application No. 202010945216.0, filed on Sep. 10, 2020, both of which are incorporated herein by reference in their entireties.

TECHNICAL FIELD

This application relates to the field of wireless communication antennas, and in particular, to an antenna for a foldable electronic device and a foldable electronic device.

BACKGROUND

A notebook computer mainly includes four parts: a housing A, a housing B, a housing C, and a housing D. The housing A is an outer housing that is disposed opposite to a screen, the housing B is a housing of a surface on which the screen is located, the housing C is a housing of a surface on which a keyboard is located, and the housing D is an outer housing corresponding to the keyboard. An assembly of the housing A and the housing B is defined as a first housing, and an assembly of the housing C and the housing D is defined as a second housing. The first housing is connected to the second housing by using rotating shafts, and the first housing, the second housing, and the rotating shafts on two sides form space. A Wi-Fi antenna is generally configured on the notebook computer for wireless Internet access, and the Wi-Fi antenna is arranged in the foregoing space. To ensure use performance of the Wi-Fi antenna, directivity of the Wi-Fi antenna is required.

SUMMARY

Embodiments of this application provide an antenna for a foldable electronic device and a foldable electronic device, to effectively optimize directivity of the antenna.

An embodiment of this application provides an antenna for a foldable electronic device. The foldable electronic device includes a first housing and a second housing. The first housing and the second housing are rotatably connected to each other by using a rotating shaft located between the first housing and the second housing, so that the foldable electronic device switches between an unfolded state and a folded state. The first housing is a housing on a side on which a display screen of the foldable electronic device is located, and the second housing is a housing on a side on which a keyboard of the foldable electronic device is located. The antenna is disposed in a space formed by a region surrounded by the first housing, the second housing, and the rotating shaft. When the foldable electronic device is in the unfolded state, an opening/closing region is formed between the first housing and the second housing.

The antenna includes a first antenna segment and a second antenna segment that are sequentially connected and disposed in a length direction of the antenna.

The first antenna segment has a first end and a second end. The first end of the first antenna segment is connected to a ground plate of the first housing. The first antenna segment extends toward the opening/closing region from the first end of the first antenna segment to the second end of the first antenna segment.

The second antenna segment has a first end and a second end. The first end of the second antenna segment is connected to the second end of the first antenna segment, so that the second antenna segment, at the first end of the second antenna segment, is disposed at an angle to the first antenna segment at the second end of the first antenna segment. The second end of the second antenna segment is spaced apart from the ground plate of the first housing. The whole of the first antenna segment is disposed away from a lower edge of the first housing relative to the whole of the second antenna segment. The second antenna segment further includes a feed part. A radio frequency module of the foldable electronic device performs feeding on the feed part of the second antenna segment by using a feed line directly or by means of coupled feeding.

In this solution, the antenna is disposed in the space formed by a region surrounded by the first housing, the second housing, and the rotating shaft. The whole of the first antenna segment is disposed away from the lower edge of the first housing relative to the whole of the second antenna segment. The second end of the second antenna segment is spaced apart from the ground plate of the first housing. In this way, the antenna radiates toward another region that is between the first housing and the second housing and that is opposite to the opening/closing region (that is, in the unfolded state, a back region formed by a back surface of the ground plate of the first housing and a back surface of the second housing, that is, a large-angle region formed between the first housing and the second housing). Then, the part of an electric field (radiating toward the opening/closing region between the first housing and the second housing, that is, radiating toward a small-angle region formed between the first housing and the second housing) excited in the space is superimposed, and a superimposed total radiation pattern is in relatively uniform omnidirectional distribution. Directivity of the antenna is reduced.

An embodiment of this application provides an antenna for a foldable electronic device. The foldable electronic device includes a first housing and a second housing. The first housing and the second housing are rotatably connected to each other by using rotating shafts located on two sides, so that the first housing may switch between an unfolded state and a folded state relative to the second housing. A closed slot is formed by surrounding a region by the first housing, the second housing, and the rotating shafts located on the two sides. The antenna is disposed in the slot of the foldable electronic device. When the foldable electronic device is used in the unfolded state, the first housing is located above the second housing.

The antenna adopted an antenna of a three-dimensional structure.

The antenna includes a first antenna segment and a second antenna segment that are sequentially connected and disposed in a length direction of the antenna. In the unfolded state, the second antenna segment is located below the first antenna segment. One end of the first antenna segment is connected to a ground plate of the first housing, and the first antenna segment extends, from one end toward a direction in which an opening/closing region of the first housing and the second housing in the unfolded state is away from the first housing.

One end of the second antenna segment is a free end. There is a gap between the free end and the ground plate of the first housing. A radio frequency signal output by a radio frequency module is received by using the second antenna segment, so that the antenna transmits the radio frequency signal outward.

In this solution, the antenna is disposed in the slot of the foldable electronic device. In the unfolded state, the second antenna segment is located below the first antenna segment. There is a gap between the free end of the second antenna segment and the ground plate of the first housing. That is, the gap is located below the first antenna segment, so that the antenna radiates toward another region that is between the first housing and the second housing and that is opposite to the opening/closing region (that is, in the unfolded state, a back region formed by a back surface of the ground plate of the first housing and a back surface of the second housing, that is, a large-angle region formed between the first housing and the second housing). Then, the part of an electric field (radiating toward the opening/closing region between the first housing and the second housing, that is, radiating toward a small-angle region formed between the first housing and the second housing) excited in the closed slot is superimposed, and a superimposed total radiation pattern is in relatively uniform omnidirectional distribution. Directivity of the antenna is reduced.

In some embodiments, the second antenna segment is an L-shaped antenna segment, and includes a first segment (that is, a vertical segment) and a second segment (that is, a horizontal segment) that intersect with each other. The first segment of the L-shaped antenna segment is connected to the first antenna segment, and one end of the second segment of the L-shaped antenna segment is a second end of the second antenna segment.

In some embodiments, the first segment of the L-shaped antenna segment is disposed perpendicular to the first antenna segment, and the second segment of the L-shaped antenna segment is disposed in parallel to the first antenna segment.

In some embodiments, the second segment of the L-shaped antenna segment is a feed part.

In some possible embodiments, the radio frequency signal output by the radio frequency module is received by using the second segment (that is, the horizontal segment) of the L-shaped antenna segment, so that the antenna transmits the radio frequency signal outward.

In some embodiments, one end of the second segment of the L-shaped antenna segment is connected to one end of a capacitor, and the other end of the capacitor is connected to the radio frequency module by using a feed line. That the horizontal segment of the L-shaped antenna segment receives the radio frequency signal output by the radio frequency module is implemented by connecting one end of the horizontal segment to the capacitor and then connecting the capacitor to the radio frequency module to receive the radio frequency signal.

In some embodiments, a notch is disposed at one end of the second segment of the L-shaped antenna segment. The antenna further includes a feed branch. A main body of the feed branch is located in the notch. An isolation gap is formed between the main body of the feed branch and the second segment. The part of the feed branch, other than the main body, is located outside the notch, and the part that is of the feed branch and is located outside the notch is connected to the radio frequency module by using the feed line, and is coupled to the second segment of the L-shaped antenna segment for feeding by using the isolation gap.

In some possible embodiments, a notch is disposed at one end of the second segment of the L-shaped antenna segment. The antenna further includes a feed branch. The feed branch is located in the notch. An isolation gap is formed between the feed branch and the second segment. The feed branch is connected to the radio frequency module by using the feed line, and is coupled to the second segment of the L-shaped antenna segment for feeding by using the isolation gap.

In some possible embodiments, a notch is disposed at one end of the second segment (that is, the horizontal segment) of the L-shaped antenna segment. A main body of a feed branch is located in the notch, so that an isolation gap is formed between the main body of the feed branch and the horizontal segment. The part of the feed branch, other than the main body, is located outside the notch. The part that is of the feed branch and that is located outside the notch is connected to the radio frequency module.

That the horizontal segment of the L-shaped antenna segment receives the radio frequency signal output by the radio frequency module is implemented by using the isolation gap to couple the feed branch to the horizontal segment after the feed branch receives the radio frequency signal to receive the radio frequency signal.

In some embodiments, a metal column is connected to a surface that is of the second segment of the L-shaped antenna and that is disposed opposite to the first antenna segment. A free end of the metal column is connected to the radio frequency module by using the feed line.

That the second segment of the L-shaped antenna segment receives the radio frequency signal output by the radio frequency module is implemented by connecting the second segment to the metal column and then connecting the metal column to the radio frequency module to receive the radio frequency signal.

In some embodiments, the first and second antenna segments of the antenna are formed by a bending metal sheet.

In some embodiments, the first antenna segment is a sheet-shaped antenna segment, and the second antenna segment is an L-shaped and sheet-shaped antenna segment.

In some embodiments, the width of the second antenna segment is less than or equal to that of the first antenna segment. In this way, radiation of the antenna can be more concentrated toward another region that is between the first housing and the second housing and that is opposite to the opening/closing region. Directivity of the antenna is further reduced.

In some embodiments, when the width of the second antenna segment is less than that of the first antenna segment, the second antenna segment is located in the middle of the first antenna segment in a width direction of the antenna.

When the width of the second antenna segment is equal to that of the first antenna segment, the second antenna segment is flush with the first antenna segment in the width direction of the antenna.

In some embodiments, there is a gap between the second end of the second antenna segment and the ground plate of the first housing. In addition, the antenna is an antenna of a three-dimensional structure. A cavity is formed by surrounding a region by the first antenna segment, the second antenna segment, and the first housing. The cavity is in communication with the gap.

An embodiment of this application provides an antenna for a foldable electronic device. The foldable electronic device includes a first housing and a second housing. The first housing and the second housing are rotatably connected to each other by using a rotating shaft located between the first housing and the second housing, so that the foldable electronic device switches between an unfolded state and a folded state. The antenna is disposed in a space formed by a region surrounded by the first housing, the second housing, and the rotating shaft. When the foldable electronic device is in the unfolded state, the first housing is located above the second housing, and an opening/closing region is formed between the first housing and the second housing.

The antenna is an antenna of a three-dimensional structure. The antenna includes a first antenna segment and a second antenna segment that are sequentially connected and disposed in a length direction of the antenna. When the foldable electronic device is in the unfolded state, the second antenna segment is located below the first antenna segment.

The first antenna segment has a first end and a second end. The first end of the first antenna segment is connected to a ground plate of the first housing. The first antenna segment extends toward the opening/closing region from the first end of the first antenna segment to the second end of the first antenna segment.

The second antenna segment has a first end and a second end. The first end of the second antenna segment is connected to the second end of the first antenna segment, so that the second antenna segment, at the first end of the second antenna segment, is disposed at an angle to the first antenna segment at the second end of the first antenna segment. The second end of the second antenna segment is spaced apart from the ground plate of the first housing. The second antenna segment further includes a feed part. A radio frequency module of the foldable electronic device performs feeding on the feed part of the second antenna segment by using a feed line directly or by means of coupled feeding.

An embodiment of this application further provides a foldable electronic device. The foldable electronic device includes the antenna for a foldable electronic device provided in any one of the embodiments.

In some embodiments, the foldable electronic device is a foldable notebook computer.

DESCRIPTIONS OF REFERENCE NUMERALS

Figure 1A:
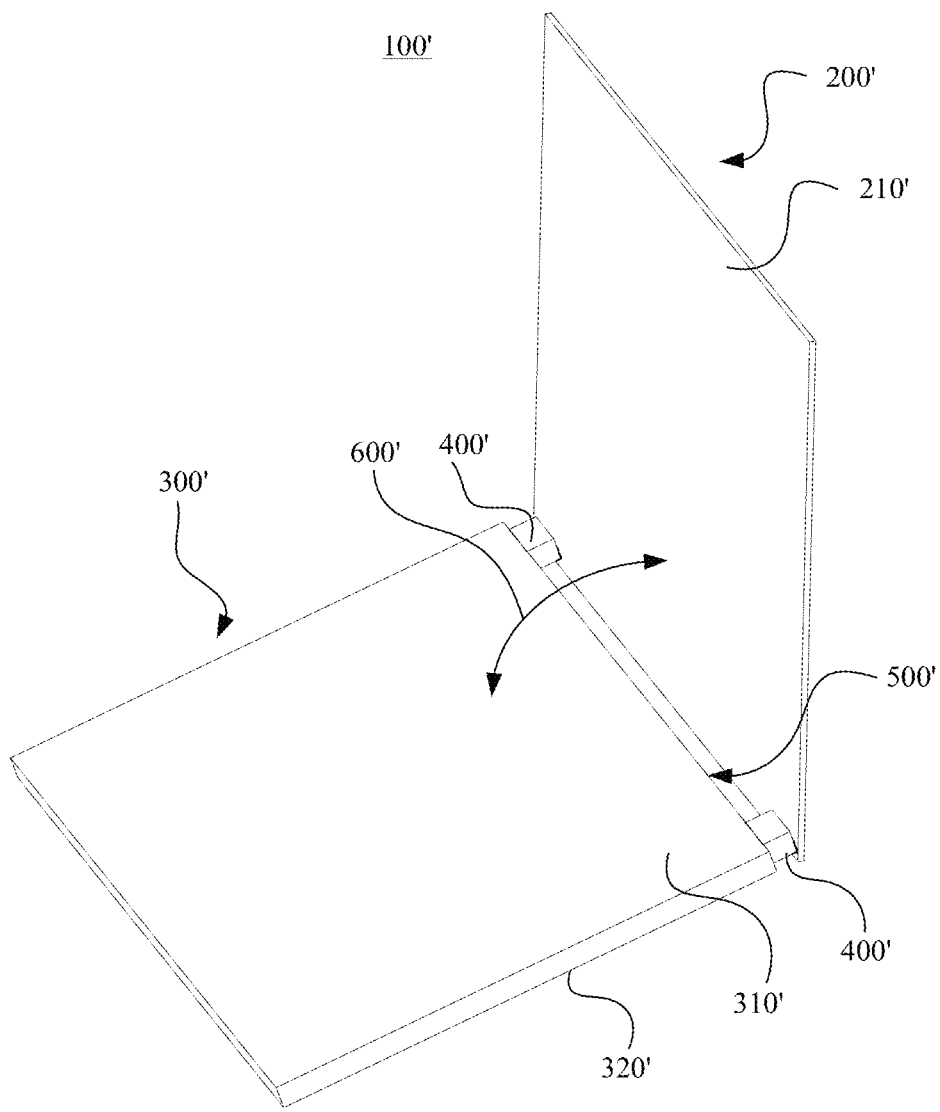
FIG. 1a is a schematic diagram (1) of a three-dimensional structure of a notebook computer in an unfolded state, where an angle of view is a side-view direction, and an antenna is not shown in the figure.

100': notebook computer; 200': first housing; 210': housing A; 300': second housing; 310': housing C; 320': housing D; 400': rotating shaft; 500': closed slot; 510': one side; 520': the other side; 600': opening/closing region; 700': planar inverted-F antenna; 710': ground part; 720': radiator; 722': feed point; 800': radio frequency module;

L': length of a radiator; W': width of the radiator; L1': length of a ground part; W1': width of the ground part; L2': length of a closed slot; W2': width of the closed slot; d1': distance between the feed point and an open end of the radiator; d2': distance between the feed point and the ground part; d3': distance between the left end of the planar inverted-F antenna and the left end of the closed slot; d4': distance between the right end of the planar inverted-F antenna and the right end of the closed slot; s1': gap between the radiator and the housing A; s2': gap between the radiator and the second housing;

100: foldable electronic device; 200: first housing; 210: housing A; 220: lower edge; 300: second housing; 310: housing C; 320: housing D; 400: rotating shaft; 500: slot; 600: opening/closing region; 610: another region; 700: antenna; 710: first antenna segment; 711: one end; 720: second antenna segment; 721: one end; 722: vertical segment; 723: horizontal segment; 724: notch; 730: gap; 740: feed branch; 741: main body; 742: isolation gap; 750: metal column; 760: cavity; 800: radio frequency module;

200A: first housing; 210A: housing A; 700A: antenna; 710A: first antenna segment; 720A: second antenna segment; 721A: one end; 722A: vertical segment; 730A: gap; 800A: radio frequency module;

α1: first included angle; α2: second included angle; L: length direction of an antenna; W: width direction of the antenna; L1: length of the first antenna segment; W1: width of the first antenna segment; L2: length of the vertical segment of the second antenna segment; W2: width of the vertical segment of the second antenna segment; L3: length of the horizontal segment of the second antenna segment; W3: width of the horizontal segment of the second antenna segment; L4: length of the slot; W4: width of the slot; d1: distance between the first antenna segment and the horizontal segment of the second antenna segment; d2: distance between one end of the second antenna segment and the ground plate of the first housing; d3: distance between the vertical segment of the second antenna segment and the second housing; d4: distance between the left end of the antenna and the left end of the slot; d5: distance between the right end of the antenna and the right end of the slot.

DETAILED DESCRIPTION OF ILLUSTRATIVE EMBODIMENTS

The following describes implementations of this application by using specific embodiments. A person skilled in the art may easily learn of other advantages and effects of this application based on content disclosed in this specification. Although this application is described with reference to some embodiments, it does not mean that a characteristic of this application is limited only to the implementations. On the contrary, a purpose of describing this application with reference to an implementation is to cover another option or modification that may be derived based on claims of this application. To provide an in-depth understanding of this application, the following descriptions include a plurality of specific details. This application may be alternatively implemented without using these details. In addition, to avoid confusion or blurring a focus of this application, some specific details are omitted from the description. It should be noted that embodiments in this application and the features in embodiments may be mutually combined in the case of no conflict.

It should be noted that, in this specification, reference numerals and letters in the following accompanying drawings represent similar items. Therefore, once an item is defined in the accompanying drawings, the item does not need to be further defined or interpreted in subsequent accompanying drawings.

In descriptions of this application, it should be noted that orientation or location relationships indicated by terms "center", "above", "below", "left", "right", "vertical", "horizontal", "inner", "outer", and the like are orientation or location relationships based on the accompanying drawings, and are merely intended for conveniently describing this application and simplifying descriptions, rather than indicating or implying that an apparatus or an element in question needs to have a specific orientation or needs to be constructed and operated in a specific orientation, and therefore cannot be construed as a limitation on this application. In addition, terms "first" and "second" are merely used for the purpose of description, and shall not be understood as an indication or implication of relative importance.

In descriptions of this application, it should be noted that unless otherwise expressly specified and limited, terms "mount", "interconnect", and "connect" should be understood in a broad sense. For example, the terms may indicate a fixed connection, a detachable connection, or an integral connection; may be a mechanical connection or an electrical connection; or may be direct interconnection, indirect interconnection through an intermediate medium, or communication between the interior of two elements. An ordinary technician in the art may understand specific meanings of the foregoing terms in this application based on a specific situation.

To make the objectives, technical solutions, and advantages of this application clearer, the following further describes the implementations of this application in detail with reference to the accompanying drawings.

Figure 1B:
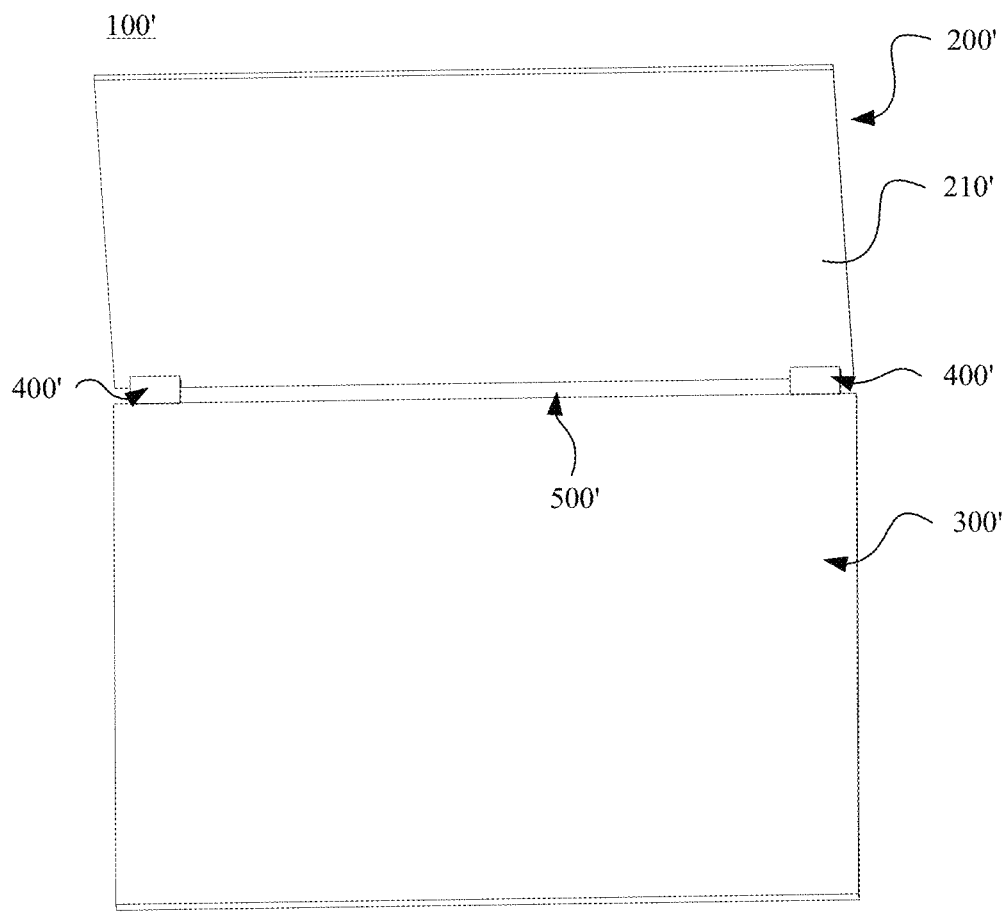
FIG. 1b is a schematic diagram (2) of a three-dimensional structure of the notebook computer in the unfolded state, where an angle of view is a front-view direction, that is, a direction in which a screen of the notebook computer faces a user, and the antenna is not shown in the figure.

As shown in FIG. 1a to FIG. 1b, a notebook computer 100' mainly includes four parts: a housing A 210', a housing B (not shown in the figure), a housing C 310', and a housing D 320'. The housing A 210' is an outer housing disposed opposite to a screen (that is, a top housing located at the top when the notebook computer 100' is in a folded state). The housing B is a housing of a surface on which the screen is located. The housing C 310' is a housing of a surface on which a keyboard is located. The housing D 320' is an outer housing corresponding to the keyboard. An assembly of the housing A 210' and the housing B is defined as a first housing 200', and an assembly of the housing C 310' and the housing D 320' is defined as a second housing 300'. The first housing 200' is connected to the second housing 300' by means of rotating shafts 400' (or referred to as hinges). Therefore, the first housing 200', the second housing 300', and the rotating shafts 400' on two sides form an empty region, and this region is space. The space is used to accommodate an antenna. In this solution, with reference to FIG. 1*b* to FIG. 1*c*, the space is a closed slot 500', that is, the slot 500' is closed in a circumferential direction.

A Wi-Fi antenna is generally configured on the notebook computer 100' for wireless Internet access. The Wi-Fi antenna is arranged in the foregoing region (that is, in the slot 500'). A pattern of the Wi-Fi antenna needs to cover the space uniformly. For different directions in the space, the antenna has different radiation or receiving capabilities, and this is directivity of the antenna. The directivity is a feature of the antenna in a far-field radiation field. Generally, a lower directivity indicates a more uniform coverage of the pattern in the space. Moreover, the directivity of the Wi-Fi antenna on the notebook computer 100' needs to be as low as possible. Therefore, some methods are in demand to reduce the directivity of the antenna. A directivity coefficient refers to a ratio of radiation power current density of an antenna in a maximum radiation direction at a given distance from the antenna to radiation power current density of an ideal non-directional antenna that has the same radiation power and that is at the same distance.

Generally, the first housing 200' and the second housing 300' are in an unfolded state during normal operation, for example, unfolded to an angle of 110°, and a pattern at this angle and a value of directivity of the pattern are mainly considered. Particularly, it needs to be noted that a radiation pattern of the antenna placed in the foregoing region includes two parts. 1. A current of the antenna, or equivalent magnetic current radiation. 2. The housing A 210' of the first housing 200', the second housing 300', and the rotating shafts 400' on the two sides form the closed slot 500'. Radiation may also be generated when the closed slot 500' is excited.

Figure 1C:
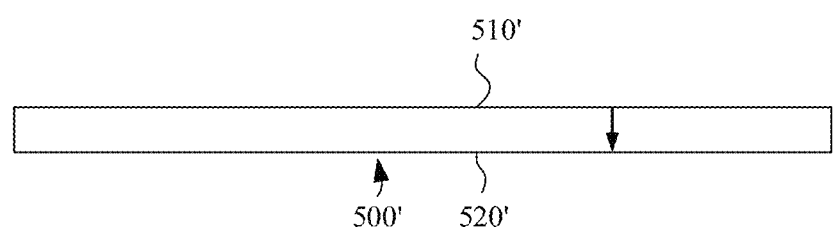
FIG. 1c is a schematic diagram of a structure of feeding of a closed slot in the notebook computer.

As shown in FIG. 1*a* to FIG. 1*c*, if the antenna is placed in the closed slot 500', an electric field in the closed slot 500' may be excited in this region, and some radiation may also be generated.

Figure 1D:
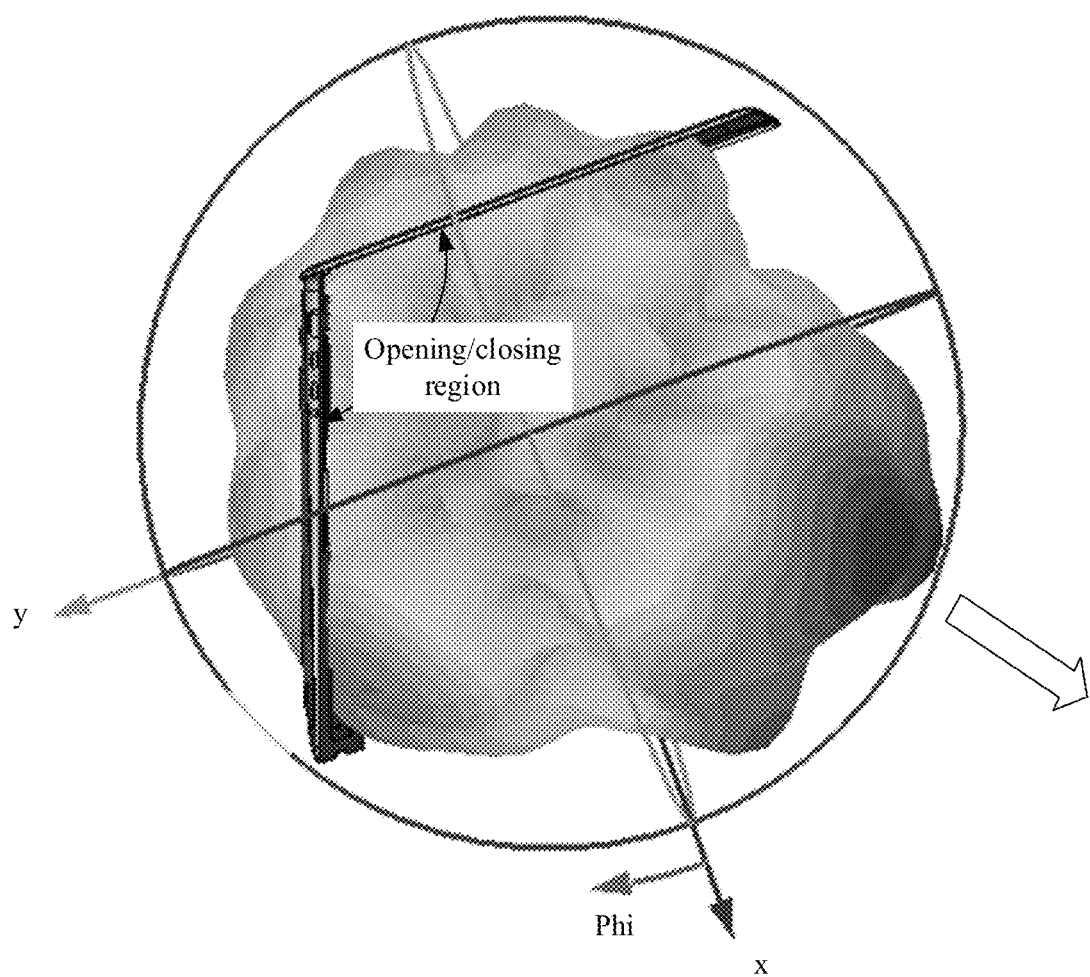
FIG. 1d is a radiation pattern of a closed slot which is excited separately.

To test directivity performance of the closed slot 500' when the closed slot 500' is separately excited, simulation analysis is performed by using full-wave electromagnetic simulation software HFSS, and a radiation pattern of the closed slot 500' shown in FIG. 1*d* is obtained. In the simulation analysis, with reference to FIG. 1*c*, it is understood that a manner of separately exciting the closed slot 500' is to connect a feed directly from one side 510' of the closed slot 500' to the other side 520'. An operating frequency excited the closed slot 500' is 2.45 GHz.

In FIG. 1*d*, a deeper grayscale indicates a greater field strength, and a part with the deepest grayscale indicates the greatest field strength. It can be learned from FIG. 1*d* that most of the electric field generated in the closed slot radiates toward the opening/closing region of the first housing and the second housing. In addition, in a simulation result, it is learned from a measurement that a directivity coefficient of the closed slot is 8.621 dBi, radiation efficiency of the antenna is −0.1844 dB, and system efficiency of the antenna is −2.964 dB. The radiation efficiency of the antenna is a value for evaluating a radiation capability of the antenna. Losses caused by a metal loss and a dielectric loss affect the radiation efficiency. The system efficiency of the antenna is actual efficiency after taking antenna port matching into consideration, that is, the system efficiency of the antenna is the actual efficiency of the antenna.

It can be learned that, referring to FIG. 1*a* to FIG. 1*d*, when the closed slot 500' on the notebook computer 100' is separately excited, the closed slot 500' radiates toward an opening/closing region 600' of the first housing 200' and the second housing 300' in a centralized manner. In other words, radiation of the electric field in the closed slot 500' is significantly affected by the first housing 200' (that is, the assembly of the housing A 210' and the housing B) and the second housing 300' (that is, the assembly of the housing C 310' and the housing D 320'). The pattern faces toward the opening/closing region 600' of the first housing 200' and the second housing 300' (that is, a formed region having an included angle of 110°).

Figure 2A:
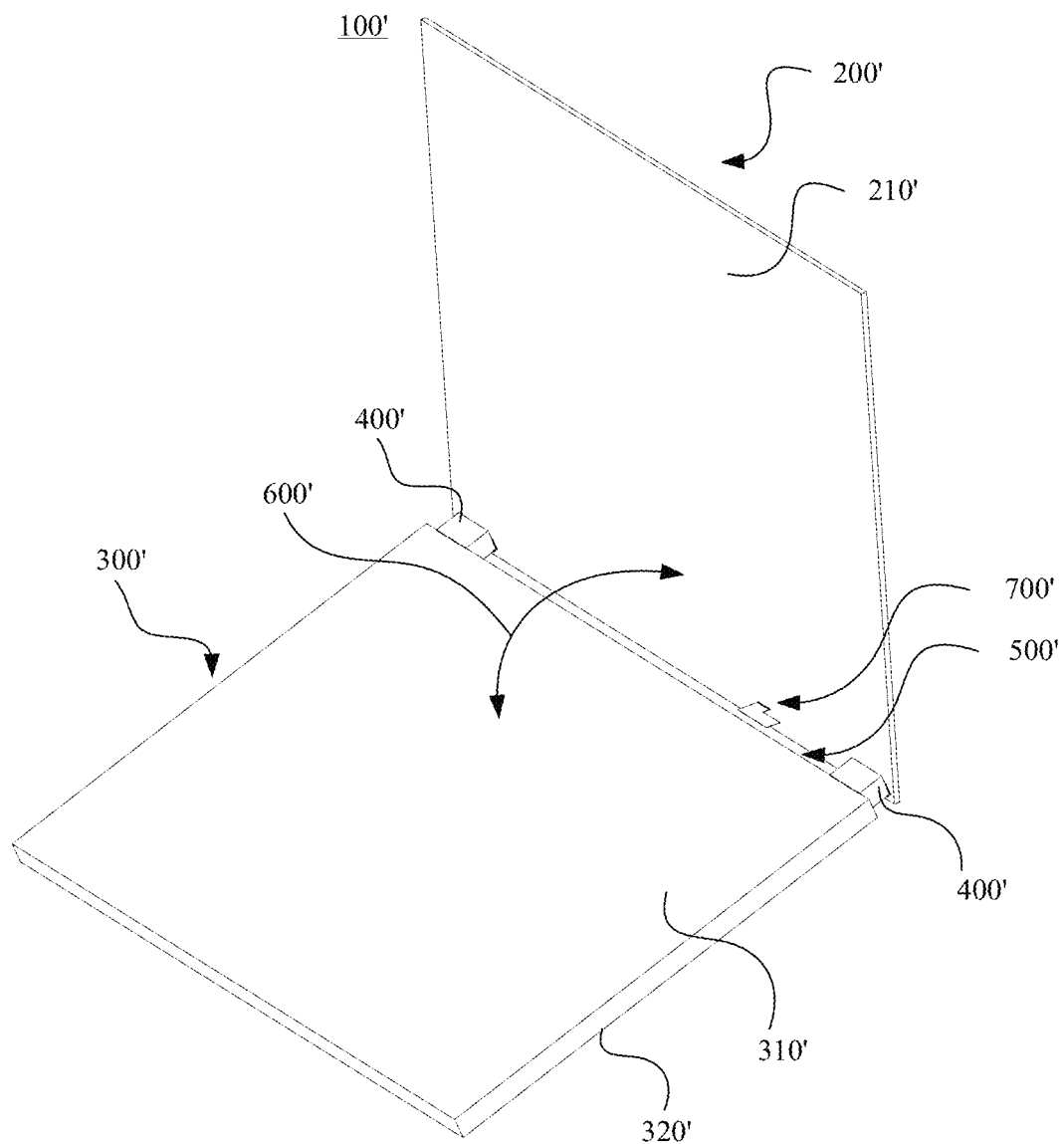
FIG. 2a is a schematic diagram (1) of a three-dimensional structure of a notebook computer in an unfolded state where a planar inverted-F antenna is placed in a closed slot, and an angle of view is a side-view direction.
Figure 2B:
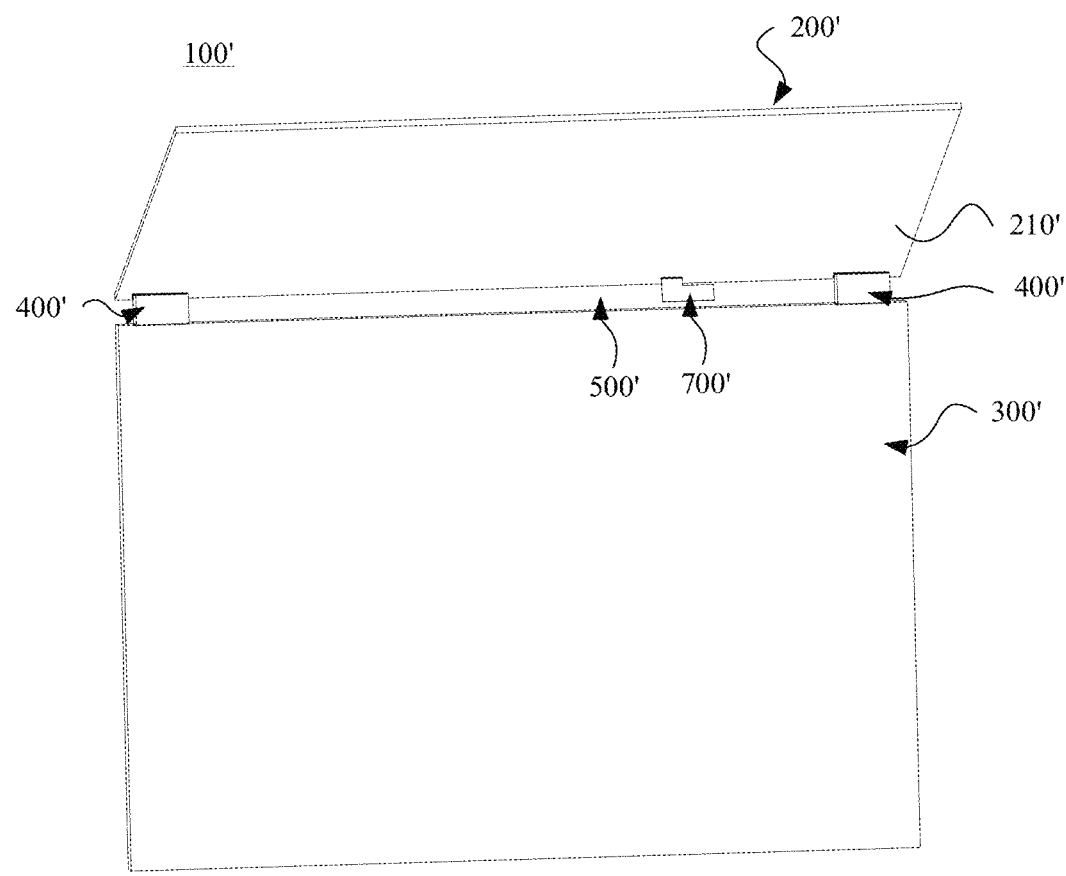
FIG. 2b is a schematic diagram (2) of a three-dimensional structure of the notebook computer in the unfolded state where the planar inverted-F antenna is placed in the closed slot, and an angle of view is a front-view direction, that is, a direction in which a screen of the notebook computer faces a user.
Figure 2C:
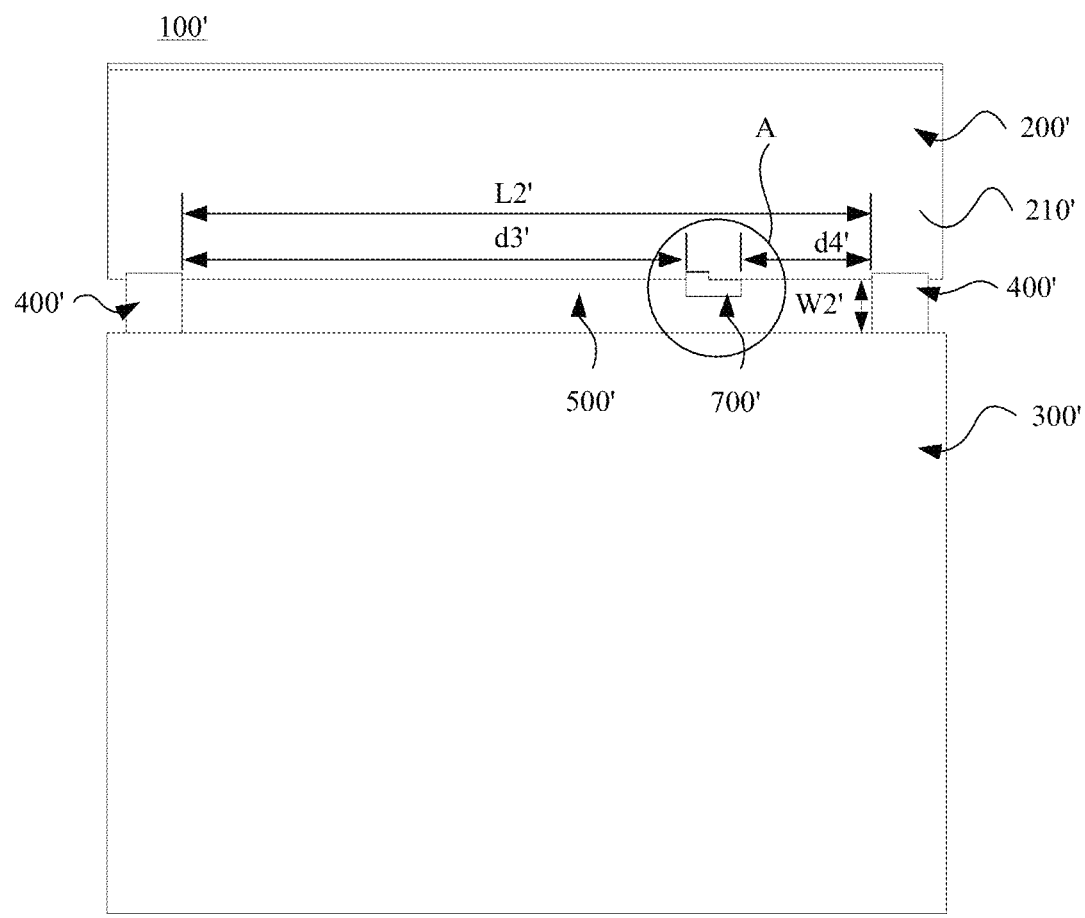
FIG. 2c is a schematic diagram of a top view of a structure of the notebook computer in the unfolded state.
Figure 2D:
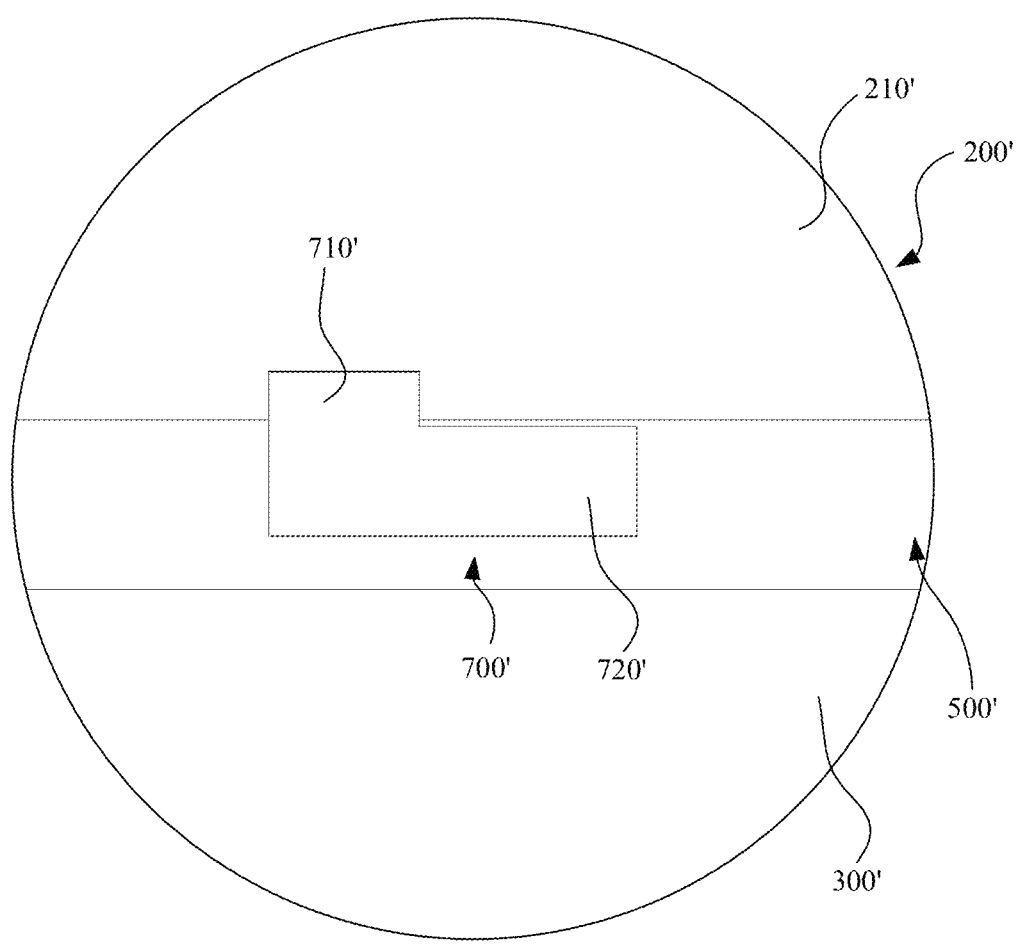
FIG. 2d is an enlargement schematic diagram of a structure of a part A in FIG. 2c.
Figure 2E:
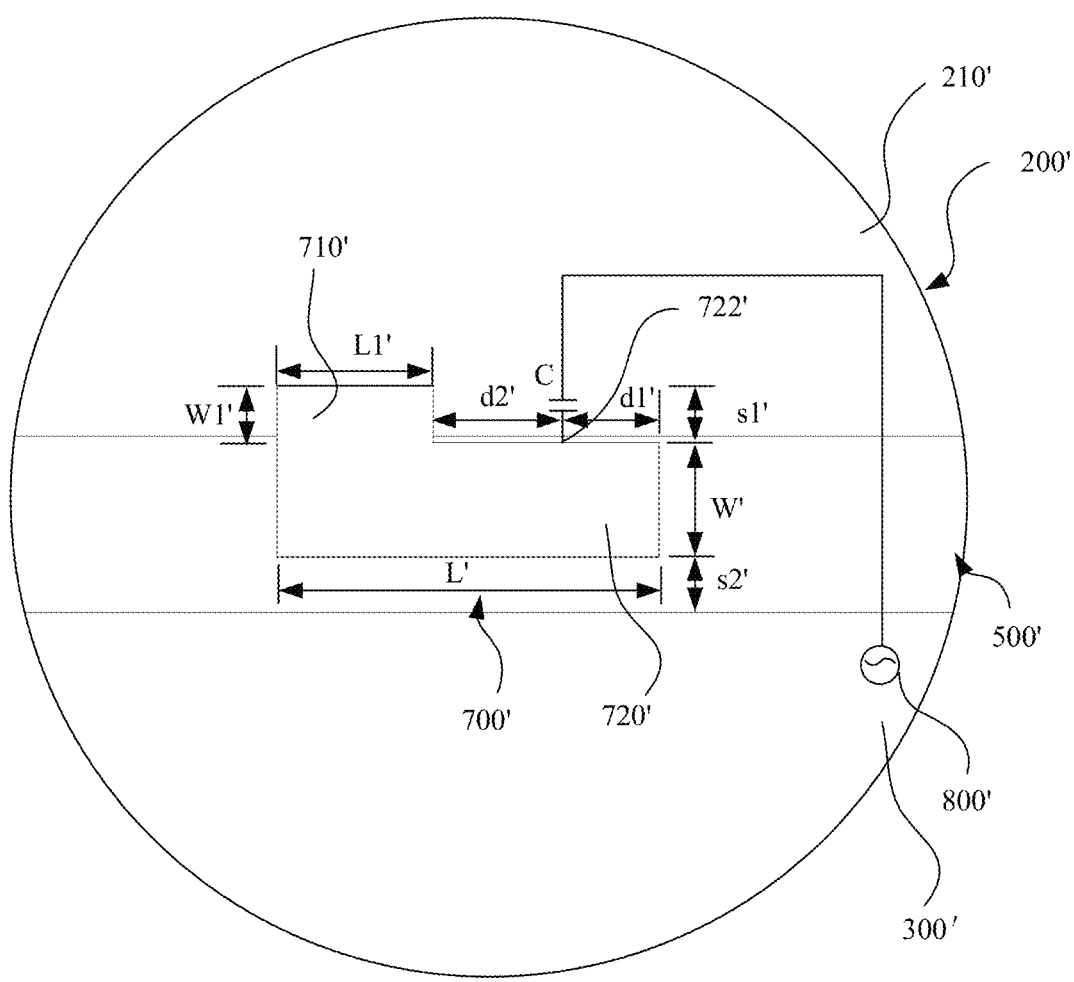
FIG. 2e is a schematic diagram of a structure of feeding of the planar inverted-F antenna in FIG. 2d.
Figure 2F:
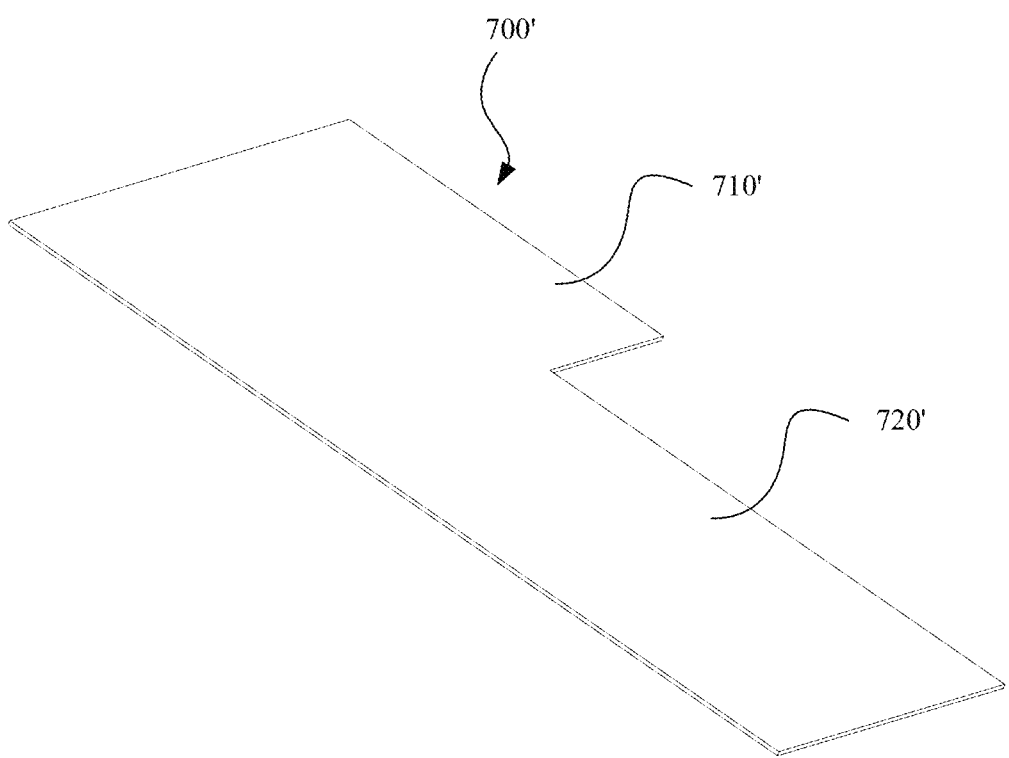
FIG. 2f is a schematic diagram of a three-dimensional structure of the planar inverted-F antenna.

As shown in FIG. 2*a* to FIG. 2*f*, in the notebook computer 100', the Wi-Fi antenna is placed in the closed slot 500' formed among the first housing 200' (that is, the assembly of the housing A 210' and the housing B), the second housing 300' (that is, the assembly of the housing C 310' and the housing D 320'), and the rotating shafts 400' on two sides. The Wi-Fi antenna is a planar inverted-F antenna 700'. A position of the planar inverted-F antenna 700' in the entire notebook computer 100' is specifically shown in FIG. 2*a* to FIG. 2*c*. A specific structure of the planar inverted-F antenna 700' is shown in FIG. 2*d* to FIG. 2*f*.

As shown in FIG. 2*e*, a ground end (that is, a ground point) on a ground part 710' of the planar inverted-F antenna 700' is connected to the housing A 210' (that is, a ground plate) of the first housing 200'. A feed point 722' on a radiator 720' of the planar inverted-F antenna 700' is connected to a radio frequency module 800' after being serially connected to a capacitor C.

Figure 2G:
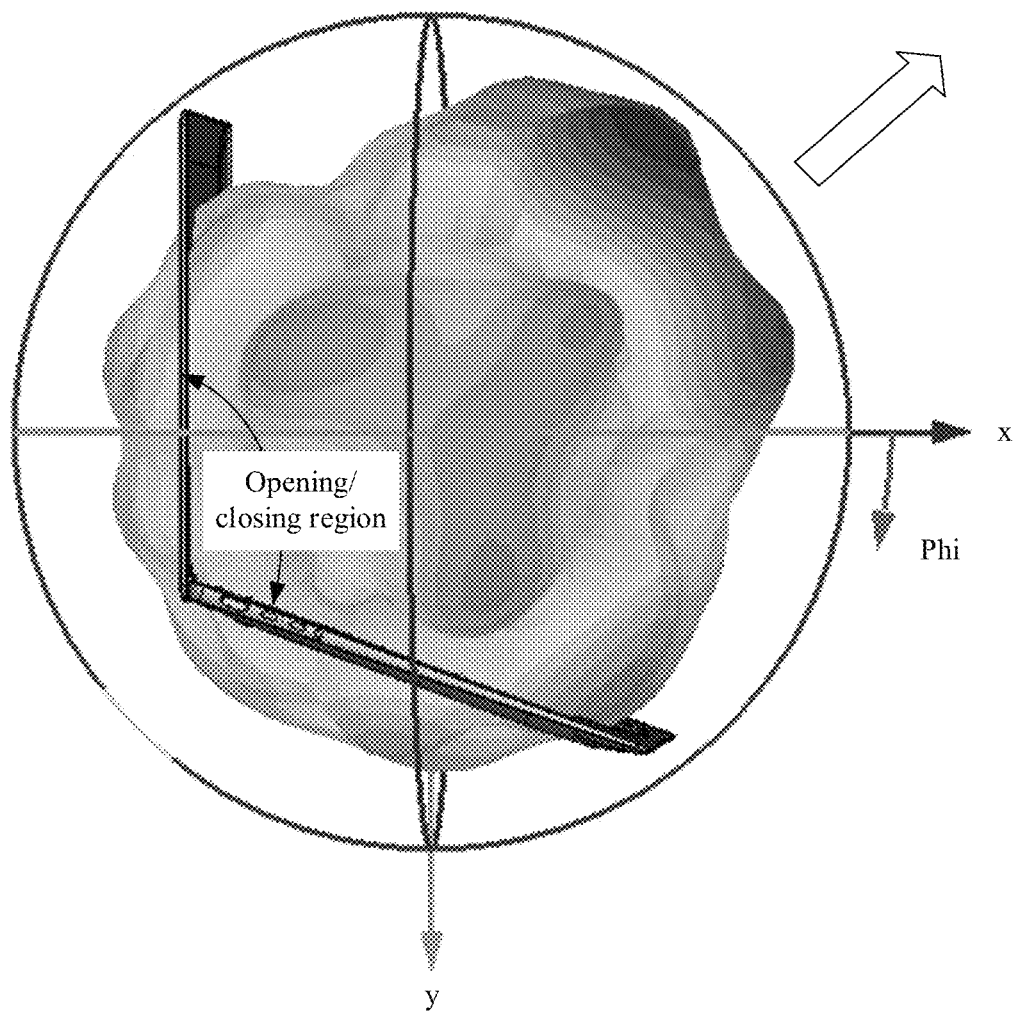
FIG. 2g is a radiation pattern of the planar inverted-F antenna.

To test directivity performance of the planar inverted-F antenna 700', simulation analysis is performed by using full-wave electromagnetic simulation software HFSS, and a radiation pattern of the planar inverted-F antenna 700' shown in FIG. 2*g* is obtained. The radiation pattern shown in FIG. 2*g* includes radiation patterns of two parts: radiation of the planar inverted-F antenna 700' disposed in the closed slot 500' and radiation of the closed slot 500'.

Simulation conditions for obtaining the curve diagram shown in FIG. 2*g* are shown in the following Table 1 (referring to FIG. 2*c* to FIG. 2*e*):

TABLE 1

| Parameter | Planar inverted-F antenna |
|---|---|
| Operating frequency of the planar inverted-F antenna | 2.45 GHz |
| Capacitance of capacitor C | 0.4 pF |
| Length L (mm) of a radiator | 22 |
| Width W (mm) of the radiator | 7 |
| Length L1 (mm) of a ground part | 9 |
| Width W1 (mm) of the ground part | 3.5 |
| Distance d1 (mm) between a feed point and an open end of the radiator | 6.5 |
| Distance d2 (mm) between the feed point and the ground part | 6.5 |

TABLE 1-continued

| Parameter | Planar inverted-F antenna |
|---|---|
| Gap s1 (mm) between the radiator and the housing A | 3.5 |
| Gap s2 (mm) between the radiator and the second housing | 1 |
| Length L2 (mm) of a closed slot | 254.5 |
| Width W2 (mm) of the closed slot | 11.5 |
| Distance d3 (mm) between the left end of the planar inverted-F antenna and the left end of the closed slot | 202 |
| Distance d4 (mm) between the right end of the planar inverted-F antenna and the right end of the closed slot | 30.5 |

In FIG. 2g, a deeper grayscale indicates a greater field strength, and a part with the deepest grayscale indicates the greatest field strength. It can be seen from FIG. 2g that most of the electric field generated by the planar inverted-F antenna (the planar inverted-F antenna is placed in the closed slot) radiates toward the opening/closing region of the first housing and the second housing. In addition, in a simulation result, it is learned from a measurement that a directivity coefficient of the planar inverted-F antenna of is 8.437 dBi, radiation efficiency of the antenna is −0.5818 dB, and system efficiency of the antenna is −1.957 dB.

It can be learned from the foregoing description that radiation of the planar inverted-F antenna 700' is omnidirectional, but is greatly affected by an angle reflection structure (that is, a structure corresponding to the opening/closing region 600') formed by the first housing 200' and the second housing 300'. Therefore, energy of the radiation pattern of the planar inverted-F antenna 700' faces toward the opening/closing region 600' of the first housing and the second housing 300' as shown in FIG. 2g. The directivity coefficient is about 8.437 dBi.

In this application, directivity of an antenna is further optimized by using technical solutions described in the following Embodiment 1 and Embodiment 2.

Embodiment 1

Figure 3:
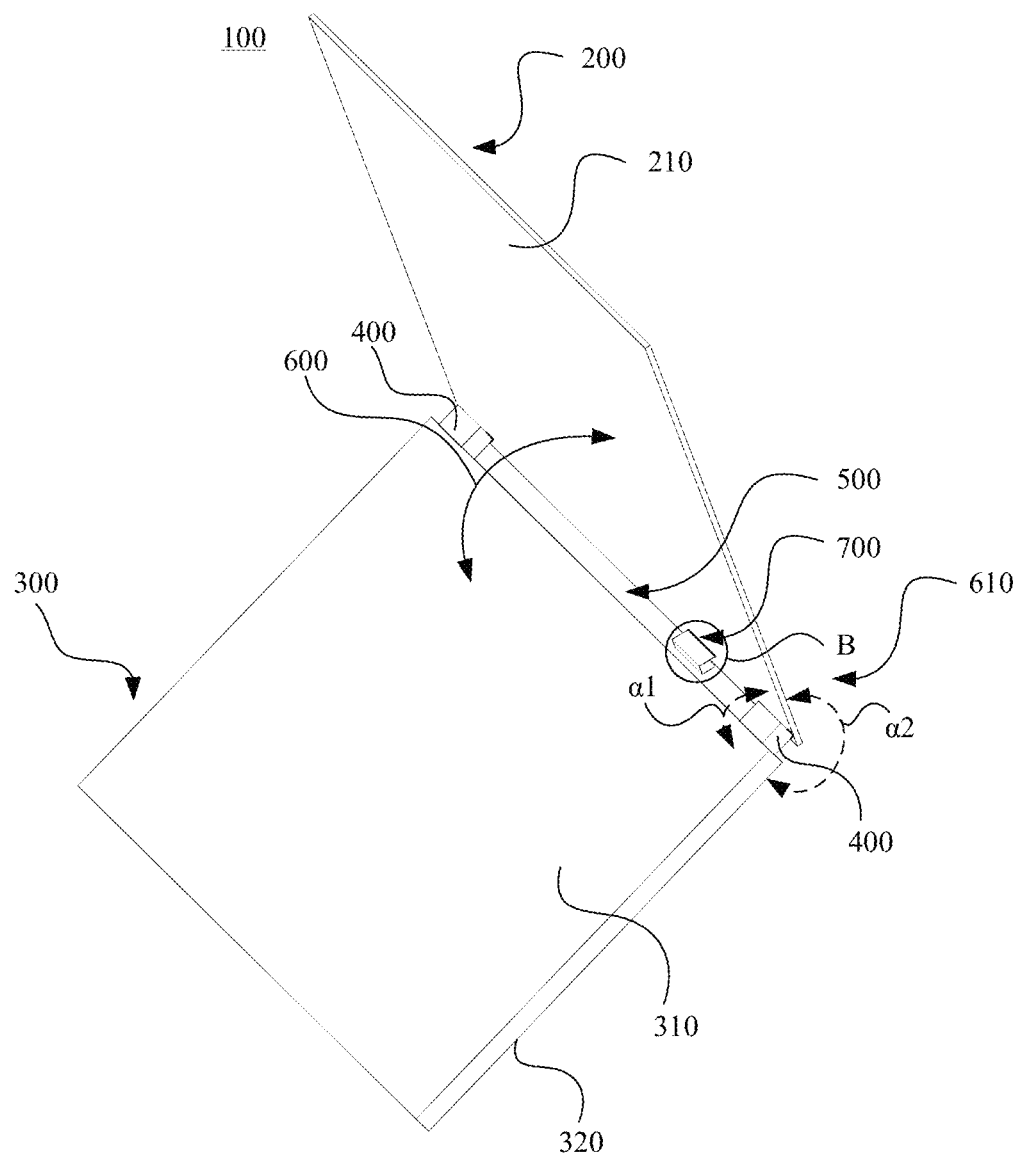
FIG. 3 is a schematic diagram (1) of a three-dimensional structure of a foldable electronic device in an unfolded state according to Embodiment 1 of this application, where an angle of view is a side-view direction.
Figure 4:
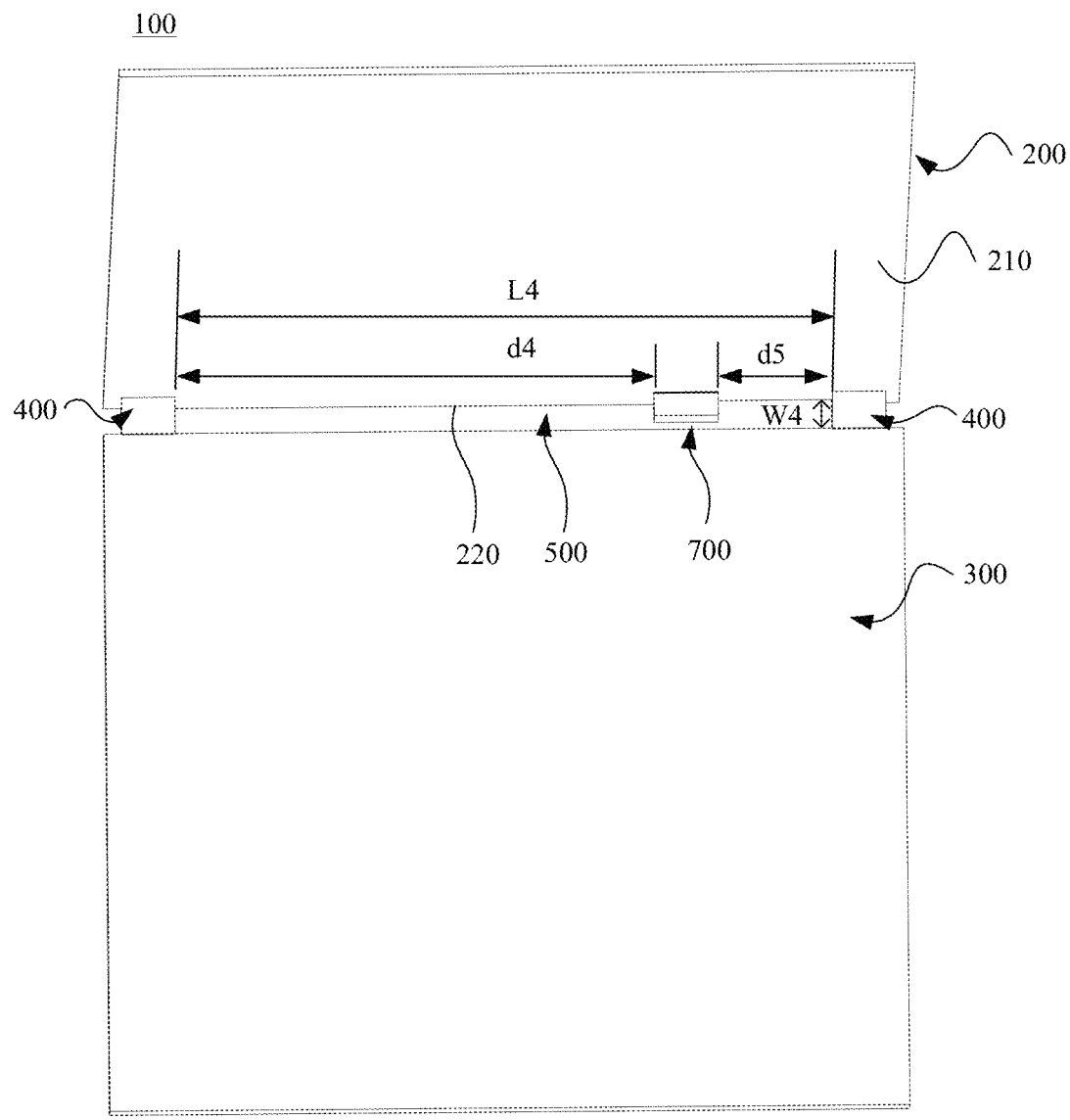
FIG. 4 is a schematic diagram (2) of a three-dimensional structure of the foldable electronic device in the unfolded state according to Embodiment 1 of this application, where an angle of view is a front-view direction, that is, a direction in which a screen of the foldable electronic device faces a user.
Figure 5:
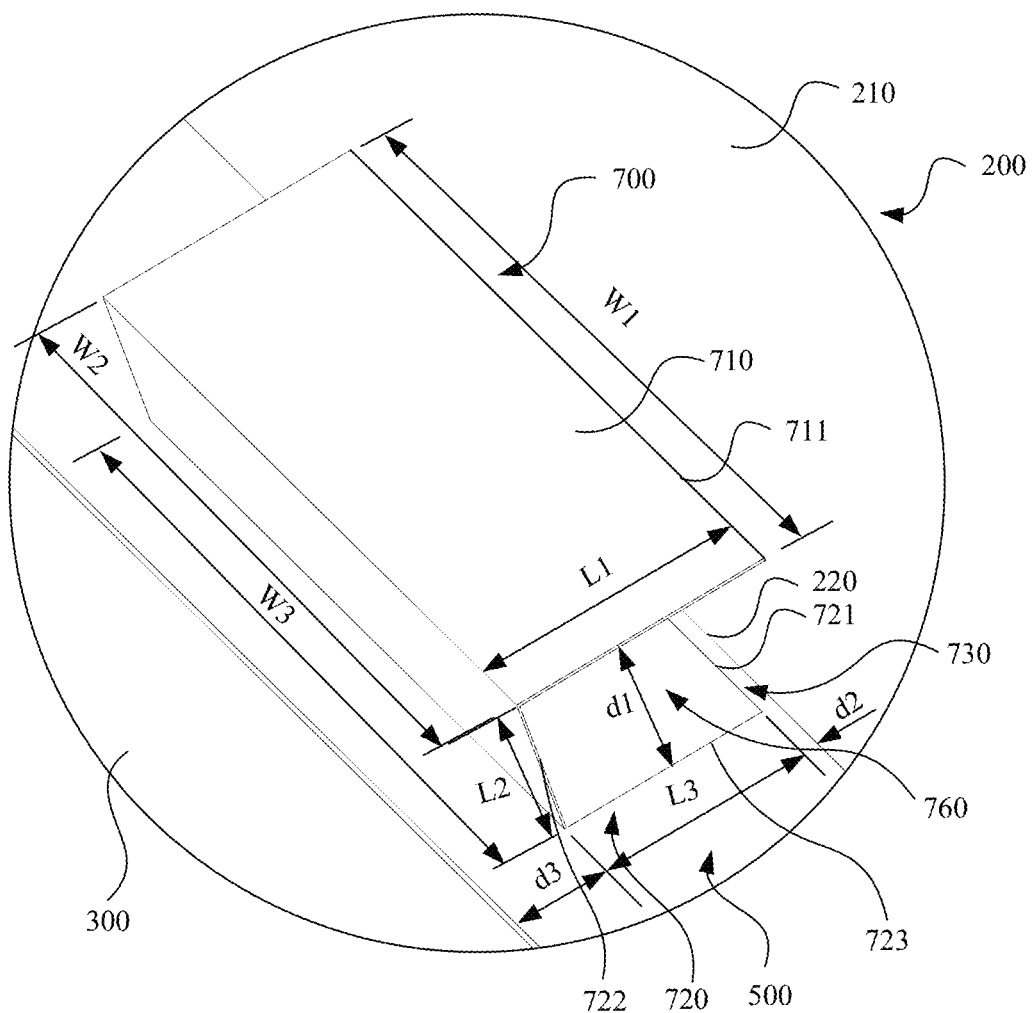
FIG. 5 is an enlargement schematic diagram of a structure of a part B in FIG. 3.

FIG. 3 and FIG. 4 are schematic diagrams of three-dimensional structures of a foldable electronic device 100 in an unfolded state from different angles of view according to Embodiment 1 of this application. An angle of view in FIG. 3 is a side-view direction. An angle of view in FIG. 4 is a front-view direction, that is, a direction in which a screen of the foldable electronic device 100 faces a user. FIG. 5 is an enlargement schematic diagram of a structure of a part B in FIG. 3.

As shown in FIG. 3 to FIG. 5, Embodiment 1 of this application provides a foldable electronic device 100. The foldable electronic device 100 includes a first housing 200, a second housing 300, and an antenna 700. In this implementation, the foldable electronic device 100 is described by taking a foldable notebook computer as an example. Certainly, a person skilled in the art may understand that, in another alternative implementation, the foldable electronic device 100 may also be other foldable electronic devices such as a foldable tablet computer or a foldable smartphone, which does not limit the protection scope of this application herein.

As shown in FIG. 3 to FIG. 4, the first housing 200 and the second housing 300 are rotatably connected to each other by using rotating shafts 400 on two sides, so that the foldable electronic device 100 can switch between an unfolded state and a folded state. An opening/closing region 600 (that is, corresponding to an region in which a first included angle α1 formed between the first housing 200 and the second housing 300 in FIG. 3 is located) is formed between the first housing 200 and the second housing 300. The opening/closing region 600 is a movement trajectory region of the first housing 200 relative to the second housing 300 in an unfolding or a folding process. Another region 610 (that is, corresponding to an region in which a second included angle α2 formed between the first housing 200 and the second housing 300 in FIG. 3 is located) opposite to the opening/closing region 600 is further formed between the first housing 200 and the second housing 300. When the foldable electronic device 100 is in the unfolded state, the first housing 200 and the second housing 300 are unfolded. The first housing 200 is located above the second housing 300, and the first included angle α1 is less than the second included angle α2, that is, the region in which the first included angle α1 is located is a small-angle region, and the region in which the second included angle α2 is located is a large-angle region. The first included angle α1 is generally 110 degrees, and the second included angle α2 is generally 250 degrees. When the foldable electronic device 100 is in the folded state, the first housing 200 and the second housing 300 are folded. The first included angle α1 is 0 degree, and the second included angle α2 is 360 degrees. Certainly, a person skilled in the art may understand that, a user may also adjust angles of the first included angle α1 and the second included angle α2 of the foldable electronic device 100 in the unfolded state to proper angles based on an actual requirement, which does not limit the protection scope of this application herein. In addition, a person skilled in the art may understand that, when the foldable electronic device 100 is in the unfolded state, the second housing 300 is placed horizontally on a workbench (for example, a desk), that is, to ensure that the foldable electronic device 100 can be placed stably, and the user may normally use the foldable electronic device 100.

In this implementation, the first housing 200 includes a housing A 210 and a housing B (not shown in the figure) that are fastened to each other. The second housing 300 includes a housing C 310 and a housing D 320 that are fastened to each other. The housing A 210 is a ground plate of the first housing 200, that is, a ground (GND) of the foldable electronic device 100. The housing A 210 is an outer housing (that is, a top housing located at the top when the foldable notebook computer is in the folded state) disposed opposite to the screen, the housing B is a housing on a surface on which the screen is located, the housing C 310 is a housing on a surface on which a keyboard is located, and the housing D 320 is an outer housing corresponding to the keyboard. That is, the first housing 200 is a housing on a side on which a display screen of the foldable electronic device 100 is located, and the second housing 300 is a housing on a side on which the keyboard of the foldable electronic device 100 is located.

Space is formed by a region surrounded by the first housing 200, the second housing 300, and the rotating shafts 400 located on the two sides. The antenna 700 is disposed in the space of the foldable electronic device 100. In this implementation, the space is a closed slot 500, that is, the slot 500 is closed in a circumferential direction. The antenna 700 is disposed in the slot 500 of the foldable electronic device 100. In this implementation, the antenna 700 is mainly applied to a Wi-Fi antenna. Certainly, a person skilled in the art may understand that, in another alternative implementation, the antenna may also be applied to another antenna that requires a low directivity occasion.

Figure 6:
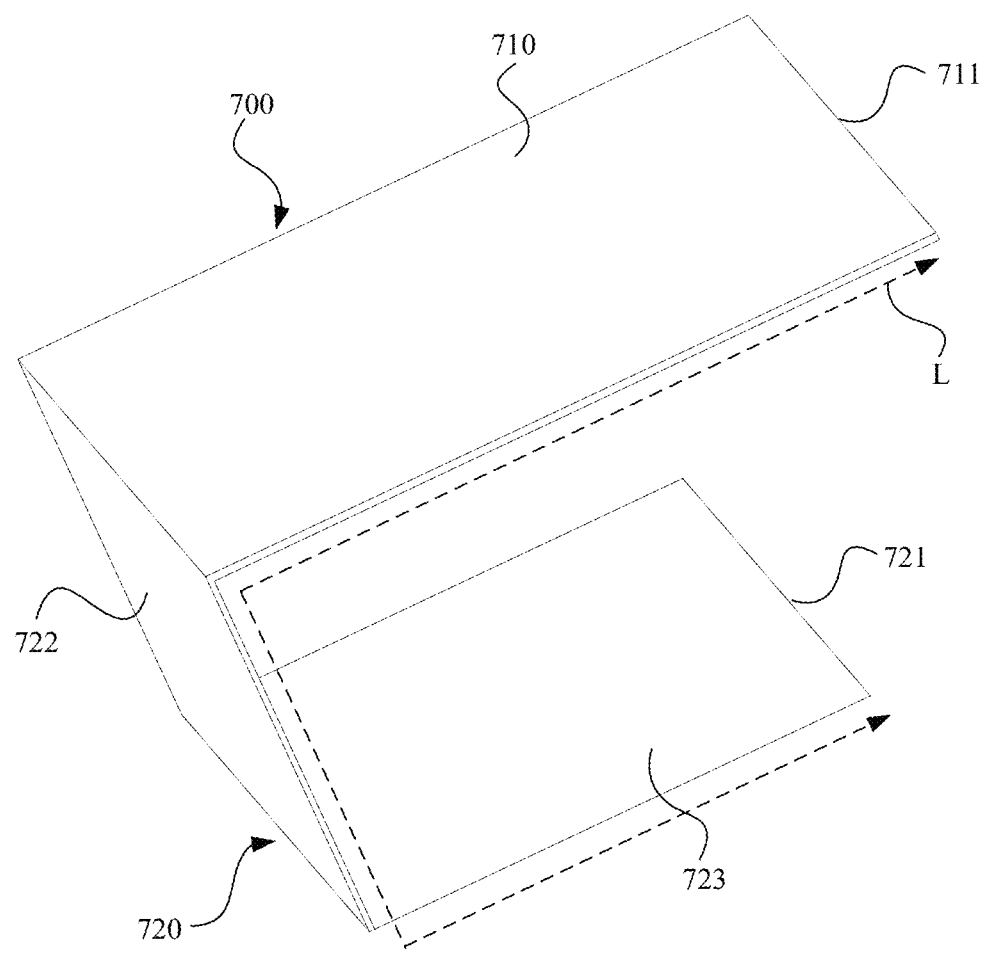
FIG. 6 is a schematic diagram (1) of a three-dimensional structure of an antenna according to Embodiment 1 of this application, where an angle of view mainly shows a structure of the antenna in a length direction.
Figure 7:
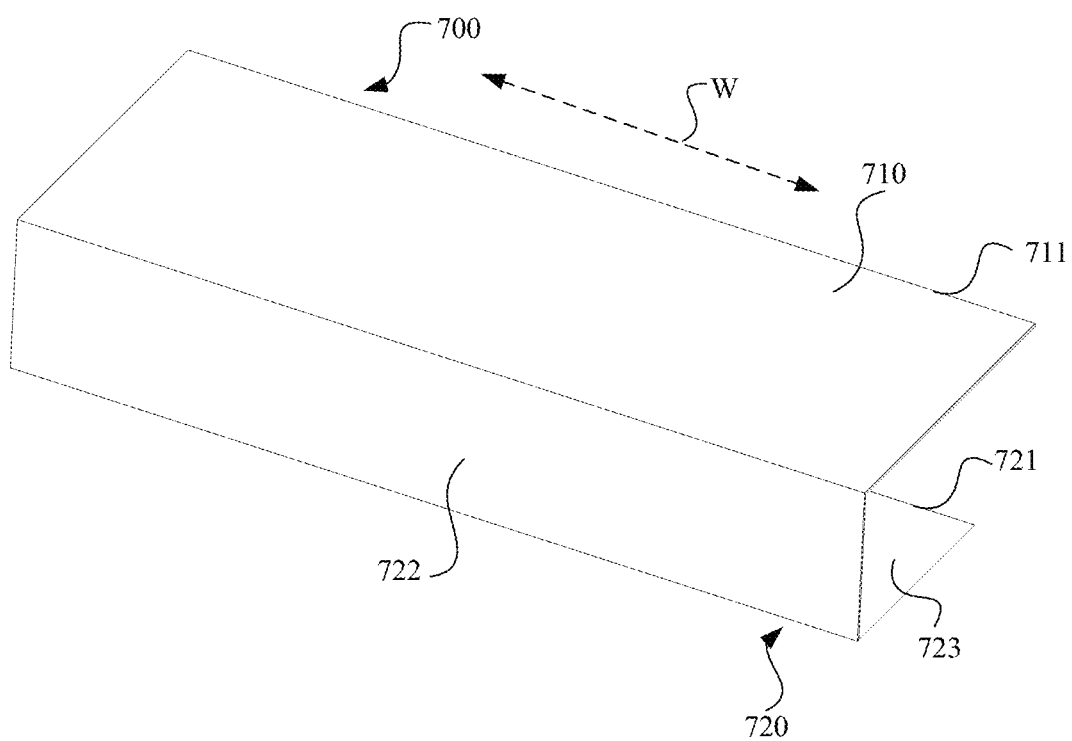
FIG. 7 is a schematic diagram (2) of a three-dimensional structure of the antenna according to Embodiment 1 of this application, where an angle of view mainly shows a structure of the antenna in a width direction.

FIG. 6 and FIG. 7 are respectively schematic diagrams of three-dimensional structures of the antenna 700 from different angles of view according to Embodiment 1 of this application. An angle of view in FIG. 6 mainly shows a structure of the antenna in a length direction L. An angle of view in FIG. 7 mainly shows a structure of the antenna in a width direction W.

As shown in FIG. 6 to FIG. 7, the antenna 700 is an antenna of a three-dimensional structure. With reference to FIG. 5, the antenna 700 includes a first antenna segment 710 and a second antenna segment 720 that are sequentially connected and disposed in the length direction L of the antenna. In the unfolded state, the second antenna segment 720 is located below the first antenna segment 710. With reference to FIG. 4 and FIG. 5, the whole of the first antenna segment 710 is disposed away from a lower edge 220 of the first housing 200 relative to the whole of the second antenna segment 720. That is, the first antenna segment 710 and the lower edge 220 of the first housing 200 are located on two opposite sides of the second antenna segment 720. In an embodiment, the lower edge of the first housing 200 is an edge that is on the first housing 200 and that is close to the second housing 300. In an embodiment, a lower edge of the housing A 210 of the first housing 200 is the lower edge 220 of the first housing 200. When the foldable electronic device 100 is in the unfolded state, an edge located at the lowest part of the housing A 210, that is, the lower edge of the housing A 210, is an edge located at the lowest part of the housing A 210 when the foldable electronic device 100 is in the unfolded state. A person skilled in the art may understand that, connection refers to an end-to-end connection between one end of the first antenna segment 710 and one end of the second antenna segment 720. The length direction L of the antenna refers to a direction of an extension path of the antenna, that is, a bending direction of the antenna shown in FIG. 6. A person skilled in the art may understand that, in this implementation, the antenna is divided into two segments, the first antenna segment and the second antenna segment for description, which is merely for ease of description, and does not distinguish structures, functions, and performance of the antennas.

As shown in FIG. 5 to FIG. 7, one end 711 (that is, a first end of the first antenna segment) of the first antenna segment 710 is connected to the ground plate (that is, the housing A 210) of the first housing 200, and the first antenna segment 710 extends, from the end 711, toward a direction in which the opening/closing region 600 is away from the first housing 200. With reference to FIG. 3, the opening/closing region 600 is the opening/closing region 600 of the first housing 200 and the second housing 300 when the foldable electronic device 100 is in the unfolded state. Grounding of the end 711 of the first antenna segment 710 and the ground plate (that is, the housing A 210) of the first housing 200 may be implemented specifically by elastically connecting an elastic piece (not shown in the figure) that is welded on the ground plate (that is, the housing A 210) to the first antenna segment 710 of the antenna 700, or by locking the end 711 of the first antenna segment 710 to the ground plate (that is, the housing A 210) by using a fastener (not shown in the figure), or by welding the end 711 of the first antenna segment 710 to the ground plate (that is, the housing A 210), or by means of other manners. Therefore, the grounding is implemented. In this implementation, the first antenna segment 710 has a first end (that is, the end 711 of the first antenna segment 710) and a second end. The second antenna segment has a first end and a second end (that is, an end 721 of the second antenna segment 720). The first end of the second antenna segment 720 is connected to the second end of the first antenna segment 710, so that the second antenna segment 720, at the first end of the second antenna segment 720, is disposed at an angle to the first antenna segment 710 at the second end of the first antenna segment 710.

The end 721 of the second antenna segment 720 (that is, the second end of the second antenna segment) is a free end. There is a gap 730 between the free end and the ground plate of the first housing 200. A cavity 760 is formed by surrounding a region by the first antenna segment 710, the second antenna segment 720, and the first housing 200. The cavity 760 communicates with the gap 730. The second antenna segment 720 further includes a feed part (in this implementation, the feed part is a horizontal segment 723 of the second antenna segment 720). A radio frequency module 800 (referring to FIG. 8) of the foldable electronic device 100 performs feeding on the feed part of the second antenna segment 720 by using a feed line directly, or by means of coupled feeding. That is, a radio frequency signal output by the radio frequency module 800 (referring to FIG. 8) is received by using the second antenna segment 720, so that the antenna 700 radiates the signal outward.

As shown in FIG. 3 to FIG. 7, the antenna 700 is disposed in the slot 500 of the foldable electronic device 100. In the unfolded state, the second antenna segment 720 is located below the first antenna segment 710. There is the gap 730 between the free end of the second antenna segment 720 and the ground plate of the first housing 200 (that is, the free end of the second antenna segment 720 is spaced apart from the ground plate of the first housing 200. In this implementation, the housing A 210 is the ground plate). That is, the gap 730 is located below the first antenna segment 710. In this way, the antenna radiates toward another region 610 (the another region 610 is opposite to the opening/closing region 600) between the first housing 200 and the second housing 300. Then, the part of an electric field (radiating toward the opening/closing region 600 between the first housing 200 and the second housing 300, that is, radiating toward a small-angle region formed between the first housing 200 and the second housing 300) excited in the closed slot 500 is superimposed, and a superimposed total radiation pattern is in relatively uniform omnidirectional distribution. Directivity of the antenna is reduced.

As shown in FIG. 5 to FIG. 7, the second antenna segment 720 is an L-shaped antenna segment. One end of a vertical segment 722 (that is, a first segment of the L-shaped antenna segment) of the L-shaped antenna segment is connected to the first antenna segment 710. One end of a horizontal segment 723 (that is, a second segment of the L-shaped antenna segment) of the L-shaped antenna segment is a free end. That is, there is the gap 730 between one end of the horizontal segment 723 of the L-shaped antenna segment and the ground plate of the first housing 200. That is, the L-shaped antenna segment has the vertical segment 722 and the horizontal segment 723 that are perpendicular to each other. A person skilled in the art may understand that, in an alternative implementation, the second antenna segment 720 may also be an antenna segment of another shape. For example, two or more antenna segments that are not perpendicular to each other and that are sequentially connected. Each antenna segment may be a straight-line segment, a bending segment, or a curve segment, which does not limit the protection scope of this application.

The horizontal segment 723 of the L-shaped antenna segment and the first antenna segment 710 face toward each other in parallel and are spaced from each other. A person skilled in the art may understand that, in another alternative implementation, the horizontal segment 723 of the L-shaped antenna segment may also be inclined relative to the first antenna segment 710 and be disposed opposite to and spaced apart from the first antenna segment 710. An extension line of the horizontal segment 723 and an extension line of the first antenna segment 710 are disposed at an angle (for example, an acute angle).

It can be seen from FIG. 6 that the antenna 700 is a structure similar to a C-shaped structure, that is, from the length direction L of the antenna, the shape of the antenna 700 is similar to a C shape. A person skilled in the art may understand that, in another alternative implementation, the antenna 700 may also be of another proper shape.

As shown in FIG. 6 to FIG. 7, the first antenna segment 710 and the second antenna segment 720 of the antenna 700 are formed by a bending metal sheet, that is, all antenna segments of the antenna are formed by a bending whole metal sheet. The first antenna segment 710 is a sheet-shaped antenna segment, and the second antenna segment 720 is an L-shaped and sheet-shaped antenna segment, that is, the L-shaped antenna segment is the L-shaped and sheet-shaped antenna segment. A person skilled in the art may understand that, in another alternative implementation, the antenna may also be formed by placing a plastic dielectric support in the slot and forming an antenna on the plastic dielectric support by using a form of LDS (Laser Direct Structuring, laser direct structuring) (a dielectric constant of a typical plastic dielectric support is 3), which does not limit the protection scope of this application herein.

The length and the width of the first antenna segment 710, the length and the width of the second antenna segment 720, and the size of a capacitor affect a resonance frequency of the antenna, and are adjusted according to a specific environment.

The following specifically describes: the width of the antenna affects the resonance frequency, radiation pattern performance, and directivity of the antenna. An impact on the resonance frequency: The antenna is of an LC resonance. The structure of the antenna along the length direction is inductive to some extent, and the gap 730 of the antenna is capacitive to some extent. The width of the antenna affects an equivalent inductance value of the antenna. The resonance frequency of the antenna is thus affected.

For an impact on the pattern and the directivity: Specifically, from a perspective of a principle of optimizing the directivity in this application, a key point of directivity optimization is that the pattern of the antenna faces toward the another region 610 opposite to the opening/closing region 600. Therefore, when the width of the antenna is wider, a degree of concentration of the pattern of the antenna in a given direction is better, and when the width of the antenna is narrower, the pattern of the antenna is not too concentrated in a given direction, but is distributed in the all directions.

In this implementation, the width of the vertical segment 722 of the second antenna segment 720 and the width of the horizontal segment 723 of the second antenna segment 720 are less than ½ of a wavelength (the wavelength is an operating wavelength of the antenna). The width of the first antenna segment 710 is less than ½ of the wavelength (the wavelength is the operating wavelength of the antenna).

Specifically, the width of the L-shaped and sheet-shaped antenna segment is less than or equal to the width of the sheet-shaped antenna segment, that is, the width of the vertical segment 722 of the second antenna segment 720 and the width of the horizontal segment 723 of the second antenna segment 720 are less than or equal to the width of the first antenna segment 710. In this way, radiation of the antenna can be more concentrated toward the another region 610 (the another region 610 is opposite to the opening/closing region 600) between the first housing 200 and the second housing 300. Directivity of the antenna is further reduced. Explanation may be made by the following mechanism: Most radiation of the antenna is radiated by using the gap 730. The first antenna segment 710 is equivalent to a function of a reflection plate to reflect all radiated energy to the another region 610 that is opposite to the opening/closing region 600. In this way, when the width of the vertical segment 722 of the second antenna segment 720 and the width of the horizontal segment 723 of the second antenna segment 720 are less than or equal to the width of the first antenna segment 710, radiation generated by the antenna can be concentrated toward the another region 610 that is opposite to the opening/closing region 600. Then, the part of the electric field that is excited in the closed slot 500 and that faces toward the opening/closing region 600 is superimposed, and the superimposed total radiation pattern is in relatively uniform omnidirectional distribution. The directivity of the antenna can be further reduced. A person skilled in the art may understand that, in another alternative implementation, the width of the L-shaped and sheet-shaped antenna segment may also be slightly greater than the width of the sheet-shaped antenna segment, and may be adjusted according to an actual requirement.

In this implementation, as shown in FIG. 6 to FIG. 7, the width of the L-shaped and sheet-shaped antenna segment is equal to the width of the sheet-shaped antenna segment. The L-shaped and sheet-shaped antenna segment is flush with the sheet-shaped antenna segment in the width direction W of the antenna. In other words, the width of the vertical segment 722 of the second antenna segment 720 and the width of the horizontal segment 723 of the second antenna segment 720 are equal to the width of the first antenna segment 710. In the width direction W of the antenna, both the vertical segment 722 of the second antenna segment 720 and the horizontal segment 723 of the second antenna segment 720 are flush with the first antenna segment 710.

Figure 8:
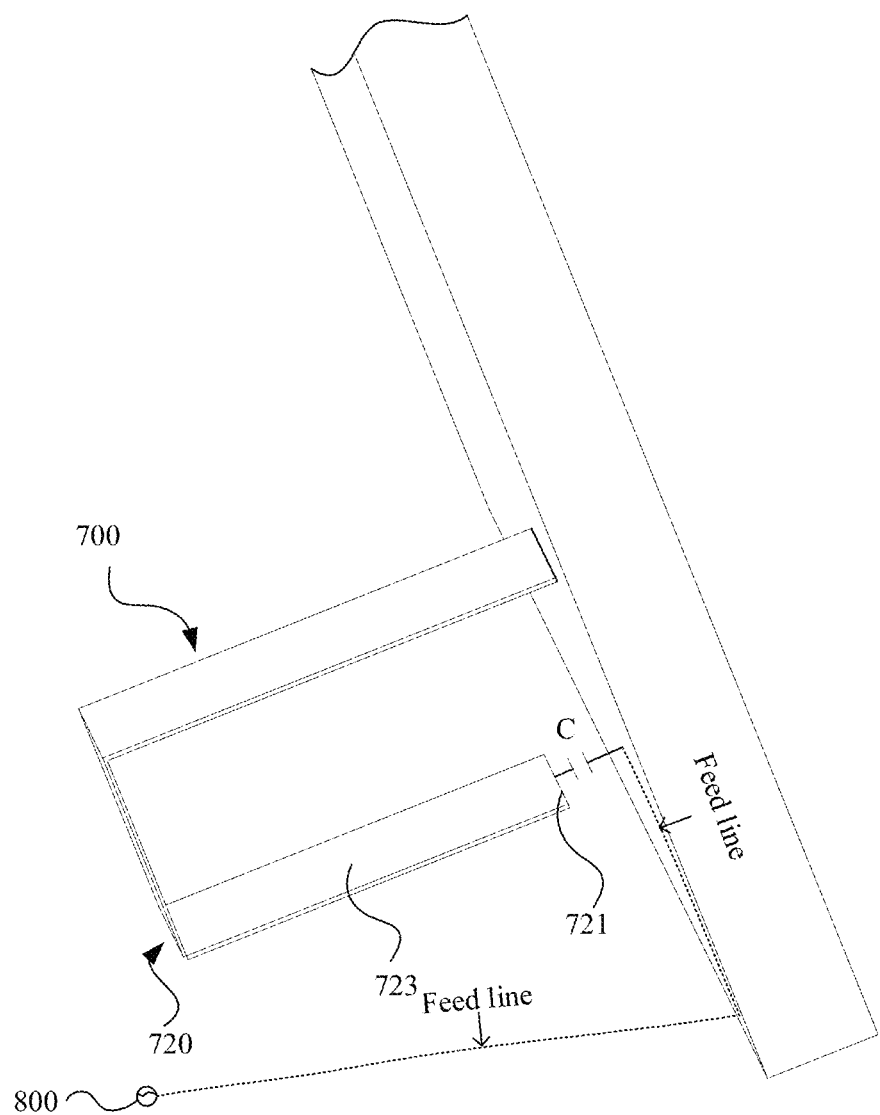
FIG. 8 is a schematic diagram of a structure of antenna feeding in an implementation according to Embodiment 1 of this application.
Figure 9:
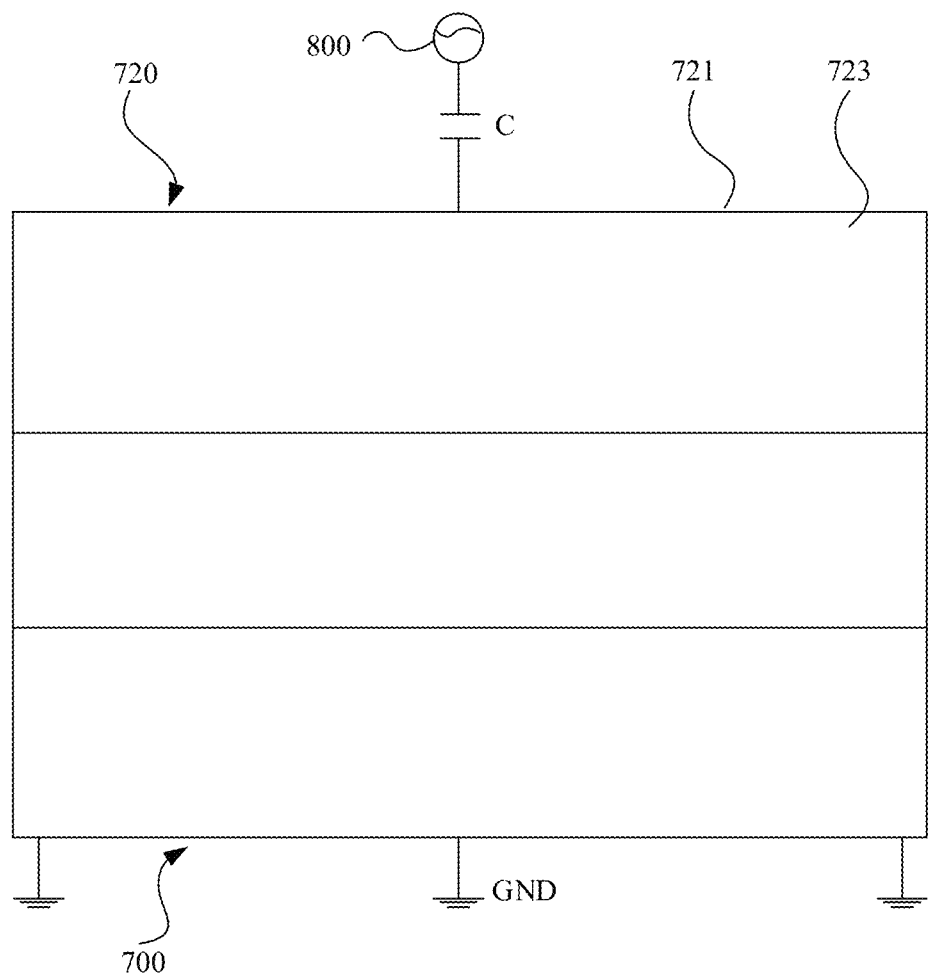
FIG. 9 is a schematic diagram of a circuit structure of antenna feeding in an unfolded state in an implementation according to Embodiment 1 of this application.

FIG. 8 is a schematic diagram of a structure of feeding of the antenna 700 in an implementation. FIG. 9 is a schematic diagram of a circuit structure of feeding of the antenna 700 in the unfolded state in an implementation. As shown in FIG. 8 to FIG. 9, in this implementation, the radio frequency signal output by the radio frequency module 800 is received by using the horizontal segment 723 of the L-shaped antenna segment (that is, the horizontal segment 723 of the second antenna segment 720), so that the antenna 700 radiates the signal outward.

Specifically, that the horizontal segment 723 of the L-shaped antenna segment (that is, the horizontal segment 723 of the second antenna segment 720) receives the radio frequency signal output by the radio frequency module 800 is implemented by connecting the one end 721 of the horizontal segment 723 to a capacitor C, and then connecting the capacitor C to the radio frequency module 800 to receive the radio frequency signal.

In this implementation, the radio frequency module 800 is disposed in the second housing 300 (referring to FIG. 3 to FIG. 4). After being connected to the capacitor C by using the feed line, the radio frequency module 800 performs feeding on the end 721 of the horizontal segment 723 of the L-shaped antenna segment. A person skilled in the art may understand that a direction of the feed line may be properly arranged according to the structure of the foldable electronic device. A proper length of the feed line may be reserved as required (for example, the feed line may reach the first housing after passing through the rotating shaft between the first housing and the second housing from the second housing, and a proper length may be reserved for the feed line passing through the rotating shaft). In this way, when the foldable electronic device switches from the folded state to the unfolded state, reliable connections among feed line, the radio frequency module 800, and the capacitor C can be guaranteed. Certainly, in another alternative implementation, the radio frequency module 800 may also be disposed in the first housing 200 (referring to FIG. 3 to FIG. 4), which does not limit the protection scope of this application herein.

A person skilled in the art may understand that a position of the capacitor C in FIG. 8 merely shows an electrical connection position relationship in the circuit structure, and does not show a mechanical and physical position of the capacitor C. The mechanical and physical position of the capacitor C may be disposed on the antenna or the first housing according to an actual requirement. For example, when the antenna is formed by the bending metal sheet, the capacitor is disposed on a circuit board that is on the first housing. One end of the capacitor is electrically connected to one end of the feed line, and the other end is electrically connected to one end of an elastic piece disposed on the circuit board. The other end of the elastic piece is elastically connected to one end of the horizontal segment of the antenna. When the antenna is formed on the plastic dielectric support by using the laser direct structuring, the capacitor C may be directly disposed on the antenna.

Figure 10:
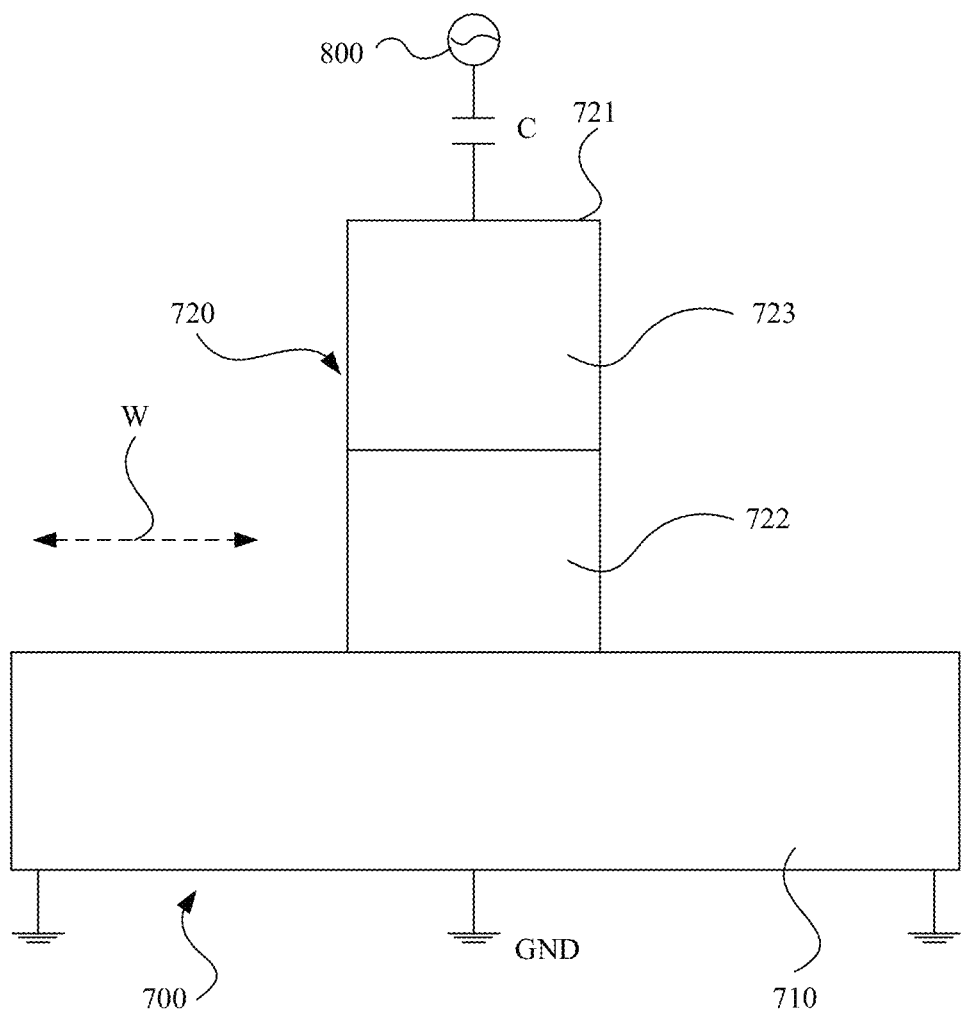
FIG. 10 is a schematic diagram of a circuit structure of antenna feeding in an unfolded state in another implementation according to Embodiment 1 of this application.

FIG. 10 is a schematic diagram of a circuit structure of feeding of the antenna 700 in the unfolded state in another implementation. As shown in FIG. 10, the width of the L-shaped and sheet-shaped antenna segment is less than the width of the sheet-shaped antenna segment. In the width direction W of the antenna, the L-shaped and sheet-shaped antenna segment is located in the middle of the sheet-shaped antenna segment. In other words, the width of the vertical segment 722 of the second antenna segment 720 and the width of the horizontal segment 723 of the second antenna segment 720 are less than the width of the first antenna segment 710. In the width direction W of the antenna, both the vertical segment 722 of the second antenna segment 720 and the horizontal segment 723 of the second antenna segment 720 are located in the middle of the first antenna segment 710.

In this implementation, that the horizontal segment 723 (that is, the horizontal segment 723 of the second antenna segment 720) of the L-shaped antenna segment receives the radio frequency signal output by the radio frequency module 800 is also implemented by connecting the end 721 of the horizontal segment 723 to the capacitor C, and then connecting the capacitor C to the radio frequency module 800 to receive the radio frequency signal.

Figure 11:
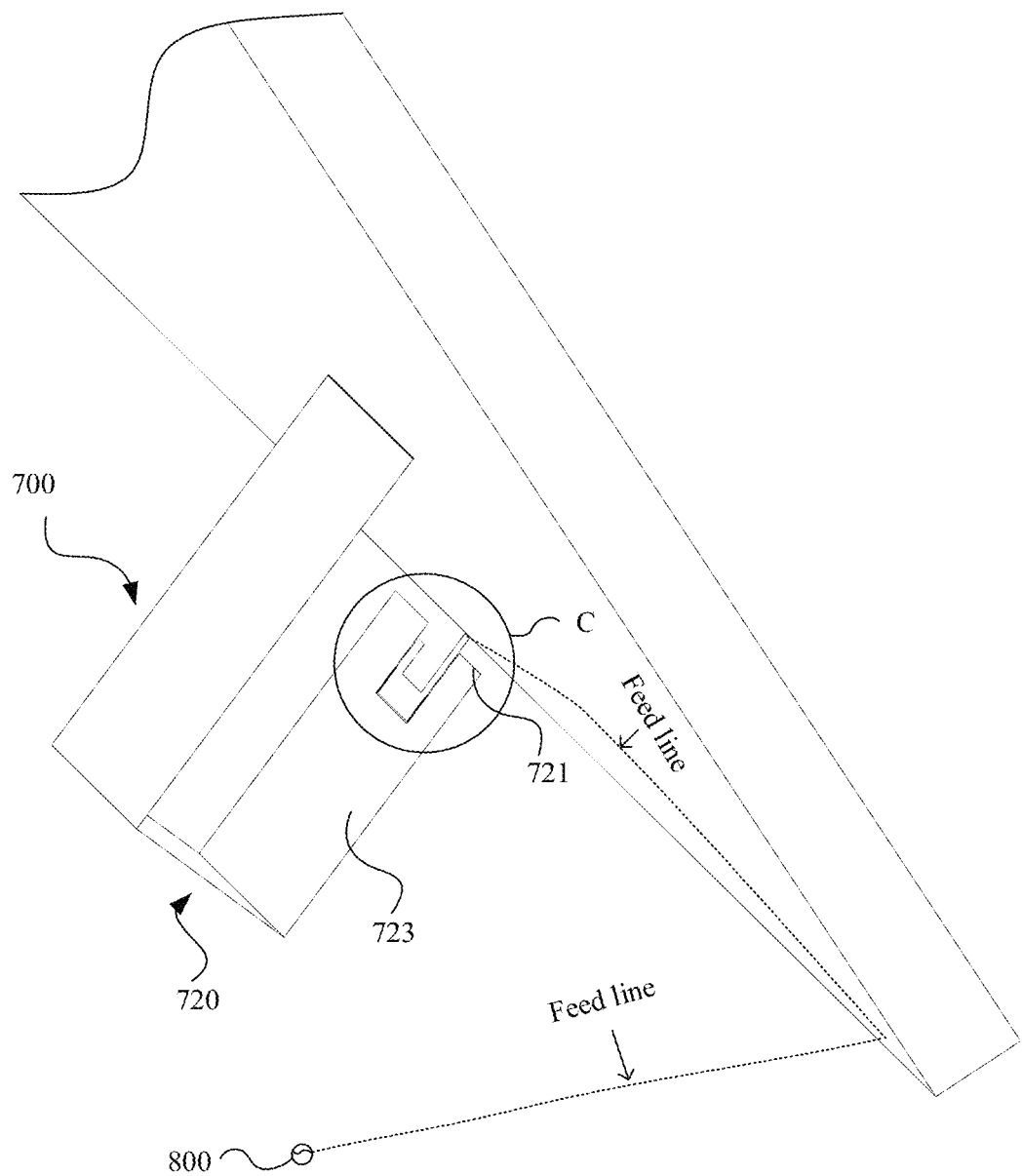
FIG. 11 is a schematic diagram of a structure of antenna feeding in still another implementation according to Embodiment 1 of this application.
Figure 12:
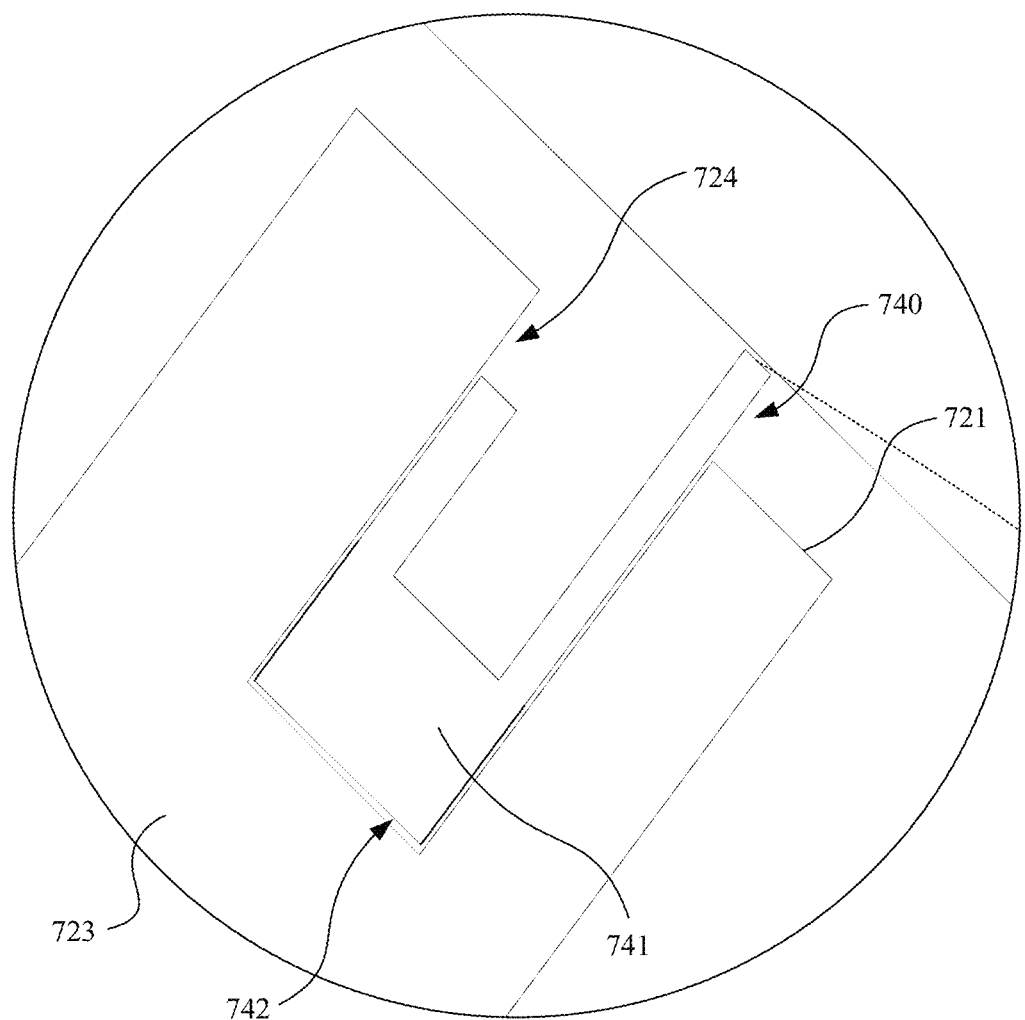
FIG. 12 is an enlargement schematic diagram of a structure of a part C in FIG. 11.

FIG. 11 is a schematic diagram of a structure of feeding of the antenna 700 in still another implementation. FIG. 12 is an enlargement schematic diagram of a structure of a part C in FIG. 11. A notch 724 is disposed at the end 721 of the horizontal segment 723 of the second antenna segment 720. A main body 741 of a feed branch 740 is located in the notch 724, so that an isolation gap 742 is formed between the main body 741 of the feed branch 740 and the horizontal segment 723. The part of the feed branch 740, other than the main body 741, is located outside the notch 724. The part that is of the feed branch 740 and that is located outside the notch 724 is connected to the radio frequency module 800. That the horizontal segment 723 of the L-shaped antenna segment (that is, the horizontal segment 723 of the second antenna segment 720) receives the radio frequency signal output by the radio frequency module 800 is implemented by using the isolation gap 742 to couple the feed branch 740 to the horizontal segment 723 after the feed branch 740 receives the radio frequency signal to receive the radio frequency signal. The isolation gap 742 is a U-shaped gap. In other words, excitation of the antenna 700 implements distributed coupled feeding by using the U-shaped gap between the horizontal segment 723 of the second antenna segment 720 and the feed branch 740. The distributed coupled feeding is distributed capacitor coupled feeding. A person skilled in the art may understand that, in another alternative implementation, the part that is of the feed branch 740 and that is connected to the radio frequency module 800 may also be located in the notch 724, which does not limit the protection scope of this application.

Figure 13:
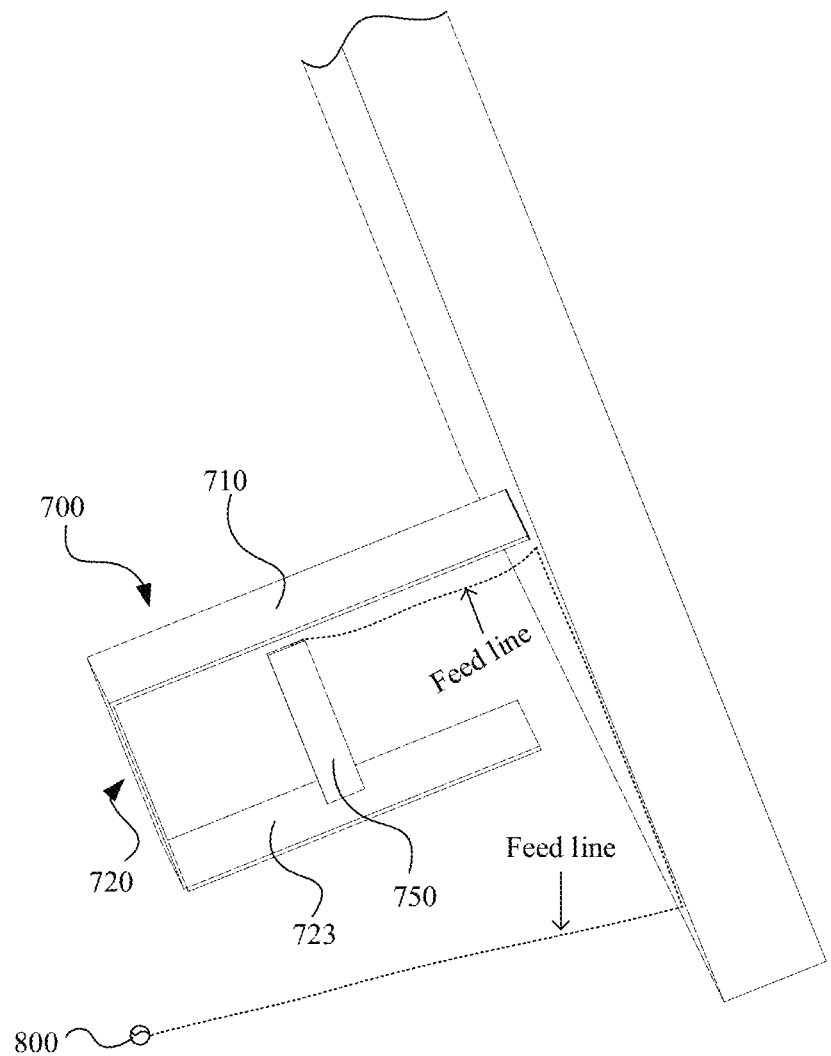
FIG. 13 is a schematic diagram of a structure of antenna feeding in yet another implementation according to Embodiment 1 of this application.

FIG. 13 is a schematic diagram of feeding of the antenna 700 in yet another implementation. As shown in FIG. 13, a metal column 750 is connected to a surface that is of the horizontal segment 723 of the L-shaped antenna segment and that is disposed opposite to the first antenna segment 710. A free end of the metal column 750 is connected to the radio frequency module 800. That the horizontal segment 723 of the L-shaped antenna segment (that is, the horizontal segment 723 of the second antenna segment 720) receives the radio frequency signal output by the radio frequency module 800 is implemented by connecting the horizontal segment 723 to the metal column 750, and then connecting the metal column 750 to the radio frequency module 800 to receive the radio frequency signal. In this implementation, the metal column 750 is disposed in the middle of the horizontal segment 723 of the second antenna segment 720 in the length direction L of the antenna. A person skilled in the art may understand that, in another alternative implementation, the surface that is of the horizontal segment 723 of the L-shaped antenna segment and that is disposed opposite to the first antenna segment 710 may also be connected to the radio frequency module 800 by disposing another metal part (such as a metal sheet and a metal strip), which does not limit the protection scope of this application.

It can be learned from the foregoing description that the antenna shown in FIG. 13 performs feeding directly by means of inductance. Inductive feeding means that there is no capacitor element or distributed coupled structure in a feed path.

The following specifically describes performance of the antenna with reference to FIG. 14 to FIG. 20b.

To test directivity performance of the antenna in this embodiment of this application, simulation analysis is performed by using full-wave electromagnetic simulation software HFSS, and simulation effect diagrams shown in FIG. 14 to FIG. 20b are obtained.

Simulation conditions for obtaining the simulation effect diagrams shown in FIG. 14 to FIG. 20b are shown in the following Table 2 (referring to FIG. 3 to FIG. 9):

TABLE 2

| Parameters | Antenna in Embodiment 1 of this application |
|---|---|
| Operating frequencies of the antenna | 2.45 GHz |
| Capacitance of the capacitor C | 0.4 pF |
| Length L1 (mm) of the first antenna segment | 10 |
| Width W1 (mm) of the first antenna segment | 29 |
| Length L2 (mm) of the vertical segment of the second antenna segment | 5 |
| Width W2 (mm) of the vertical segment of the second antenna segment | 29 |
| Length L3 (mm) of the horizontal segment of the second antenna segment | 7 |
| Width W3 (mm) of the horizontal segment of the second antenna segment | 29 |
| Distance d1 (mm) between the horizontal segment of the first antenna segment and the horizontal segment of the second antenna segment | 5 |
| Distance d2 (mm) between one end of the second antenna segment and the ground plate of the first housing | 3 |
| Distance d3 (mm) between the vertical segment of the second antenna segment and the second housing | 3.5 |
| Length L4 (mm) of the slot | 235 |
| Width W4 (mm) of the slot | 13.5 |
| Distance d4 (mm) between the left end of the antenna and the left end of the slot | 180 mm |
| Distance d5 (mm) between the right end of the antenna and the right end of the slot | 26 mm |

Figure 14:
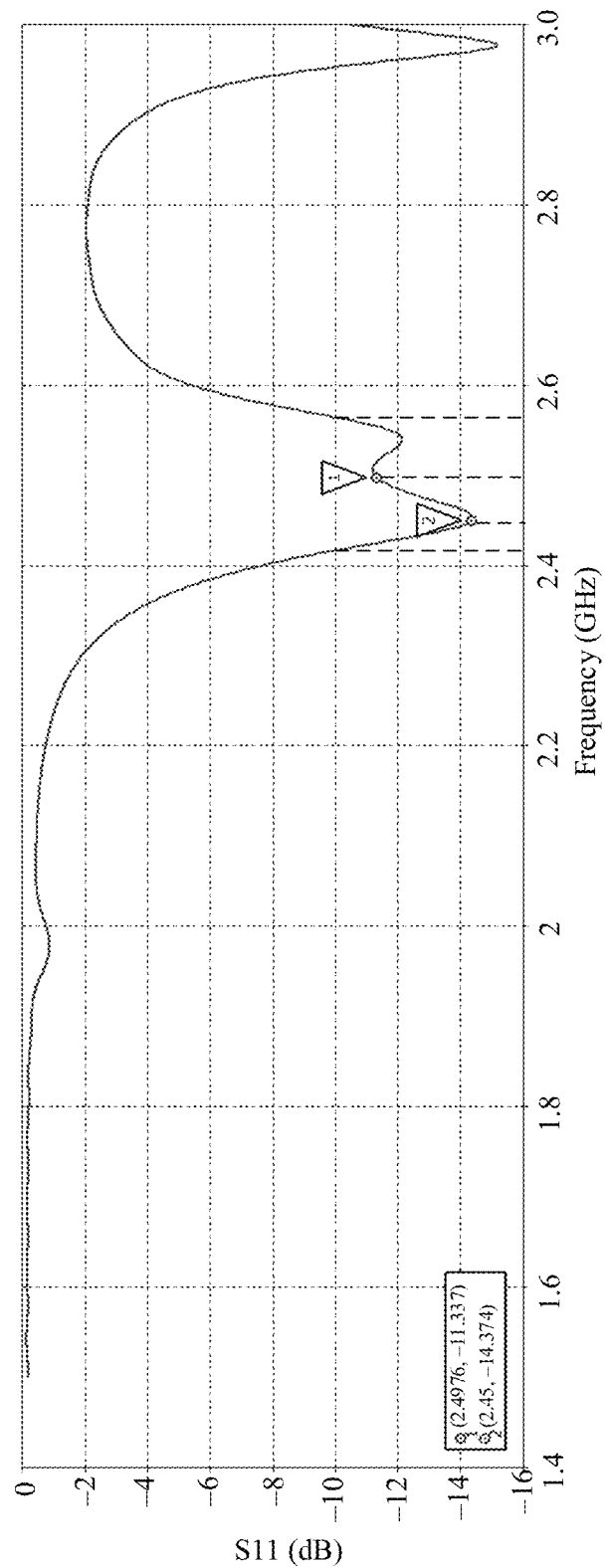
FIG. 14 is a curve diagram of S-parameter performance simulation of an antenna according to Embodiment 1 of this application.
Figure 15:
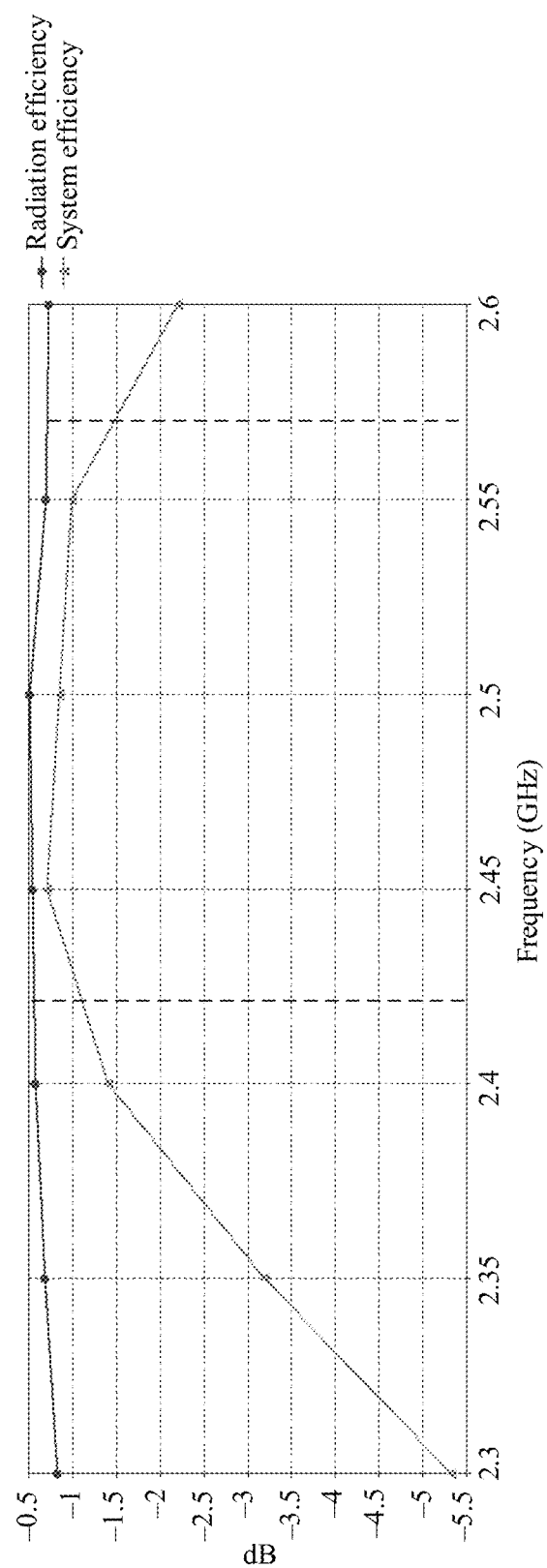
FIG. 15 is a curve diagram of efficiency simulation of an antenna according to Embodiment 1 of this application.
Figure 16:
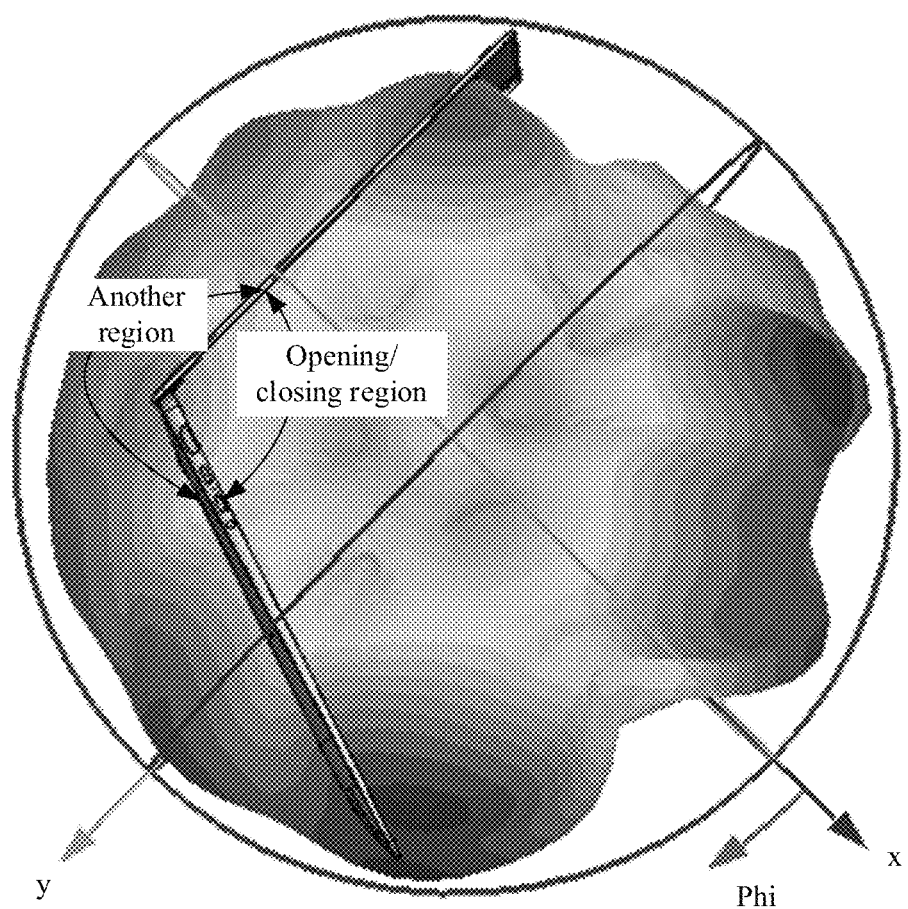
FIG. 16 is a radiation pattern of an antenna according to Embodiment 1 of this application.

FIG. 14 is a curve diagram of S-parameter performance simulation of the antenna according to Embodiment 1 of this application. FIG. 15 is a curve diagram of efficiency simulation of the antenna according to Embodiment 1 of this application. FIG. 16 is a radiation pattern of the antenna according to Embodiment 1 of this application.

In FIG. 14, a horizontal coordinate represents a frequency in a unit of GHz, and a vertical coordinate represents an amplitude value of S11 in a unit of dB. S11 is one of the S parameters. S11 represents a reflection coefficient, and this parameter represents transmit efficiency of the antenna. A smaller value represents smaller energy reflected by the antenna, and efficiency of the antenna is higher. Two points marked in the curve in the figure represent two resonance frequency points of the antenna. Point 1 is mainly a resonance frequency point of the antenna. A resonance frequency at the point is 2.4976 GHz, and S11 is −11.337 dB. Point 2 is mainly a resonance frequency point of an operating mode of the slot. A resonance frequency at the point is 2.45 GHz, and S11 is −14.374 dB.

It can be learned from FIG. 14 that in a frequency band of 2.42 GHz to 2.57 GHz, the antenna has better impedance matching, that is, S11 is less than −10 dB. That is, an operating frequency band of the antenna covers 2.42 GHz to 2.57 GHz. That is, an absolute bandwidth of −10 dB S11 of the antenna is 0.15 GHz, and a relative bandwidth of the −10 dB S11 of the antenna is 6.0%. Therefore, the antenna features a moderate bandwidth.

Referring to FIG. 15, a horizontal coordinate represents a frequency in a unit of GHz, and a vertical coordinate represents a radiation frequency and a matching frequency of the antenna in a unit of dB. Two curves in the figure respectively represent radiation efficiency and system efficiency of the antenna. The radiation efficiency of the antenna is a value for evaluating a radiation capability of the antenna. Losses caused by a metal loss and a dielectric loss affect the radiation efficiency. The system efficiency of the antenna is actual efficiency after taking antenna port matching into consideration, that is, the system efficiency of the antenna is the actual efficiency of the antenna. A person skilled in the art may understand that the efficiency is generally represented by a percentage, and there is a corresponding conversion relationship between the efficiency and dB. For example, if 50% of energy is radiated, a dB value is −3 dB. If 90% of energy is radiated, a dB value is −0.046 dB. Therefore, it is better for the efficiency to be closer to 0 dB.

It can be learned from FIG. 15 that the radiation efficiency of the antenna in the operating frequency band 2.42 GHz to 2.57 GHz is −0.7 dB to −0.5 dB, and the antenna features better radiation performance. In addition, the system efficiency of the antenna in the operating frequency band 2.42 GHz to 2.57 GHz is −1.5 dB to −0.7 dB, and the antenna features better port impedance matching.

FIG. 16 shows the radiation pattern of the antenna when the working frequency is 2.45 GHz. In FIG. 16, a deeper grayscale indicates a greater field strength, and a part with the deepest grayscale indicates the greatest field strength. The radiation pattern shown in FIG. 16 includes radiation patterns of two parts: radiation of the antenna disposed in the closed slot and radiation of the closed slot.

It can be learned from FIG. 16 that radiation energy of the antenna facing the opening/closing region (that is, facing a region where the first included angle is located) of the first housing and the second housing and facing the another region opposite to the opening/closing region (that is, the facing a region where the second included angle is located) is relatively uniform. In particular, energy facing the region where the second included angle α2 is located is obviously enhanced. The directivity coefficient of the antenna is reduced from 8.437 dBi to 5.8 dBi. That is, energy of omnidirectional radiation of the antenna is relatively uniform and is not concentrated in a given angle or direction. In addition, when the operating frequency of the antenna is 2.45 GHz, the radiation efficiency of the antenna is −0.5434 dB, and the system efficiency of the antenna is −0.7050 dB.

The following describes in detail a working mechanism of the antenna in this application with reference to FIG. 17 to FIG. 20b.

Figure 17:
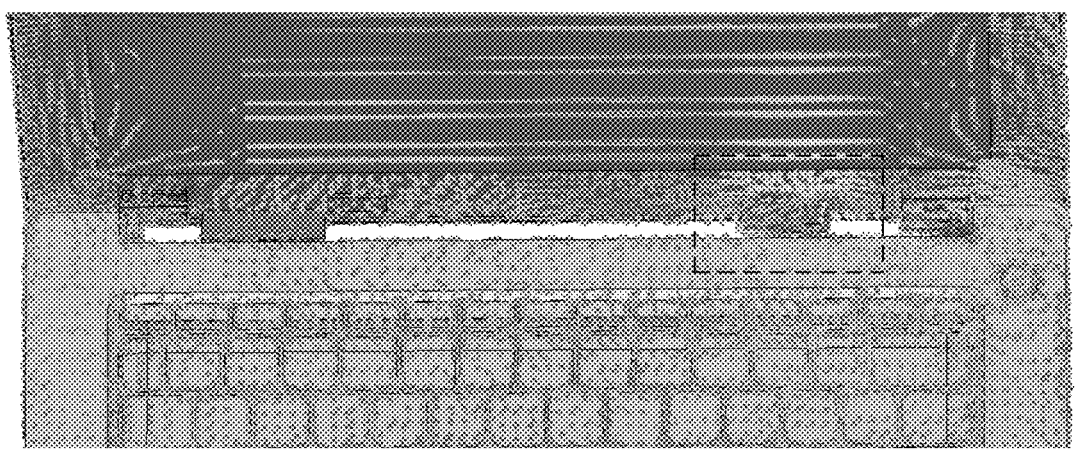
FIG. 17 is a schematic diagram of a structure of current distribution at a position that is of a foldable electronic device and that is close to an antenna according to Embodiment 1 of this application.
Figure 18:
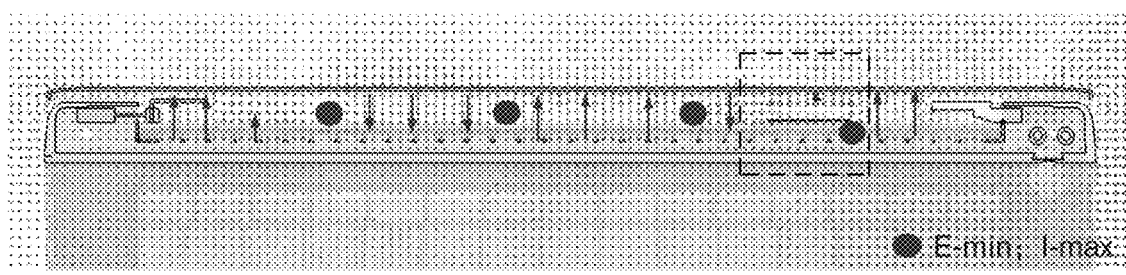
FIG. 18 is a schematic diagram of a structure of electric field distribution at a position that is of a foldable electronic device and that is close to an antenna according to Embodiment 1 of this application.

FIG. 17 is a schematic diagram of a structure of current distribution at a position that is of a foldable electronic device and that is close to an antenna when a frequency is 2.4976 GHz. FIG. 18 is a schematic diagram of a structure of electric field distribution at a position that is of the foldable electronic device and that is close to the antenna when the frequency is 2.4976 GHz.

It can be learned from FIG. 17 that strong currents are concentrated near the antenna, that is, an region in which a dashed box in the figure is located. It can be learned from FIG. 18 that strong electric fields are concentrated near the antenna, that is, an region in which a dashed box in the figure is located. In FIG. 18, an arrow represents a direction of an internal electric field of the slot, and a circle represents a position at which the direction of the internal electric field in the slot changes. This figure is for explaining distribution laws of the electric fields in the antenna and the slot at the resonance frequency point of the antenna (that is, the resonance frequency is 2.4976 GHz).

Figure 19:
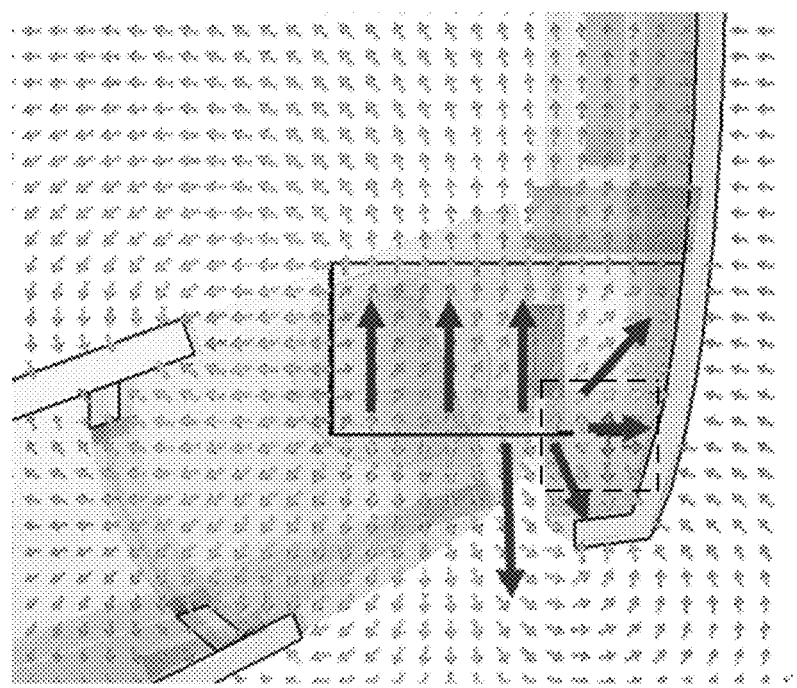
FIG. 19 is a schematic diagram of a structure of partial electric field distribution of an antenna according to Embodiment 1 of this application.
Figure 20A:
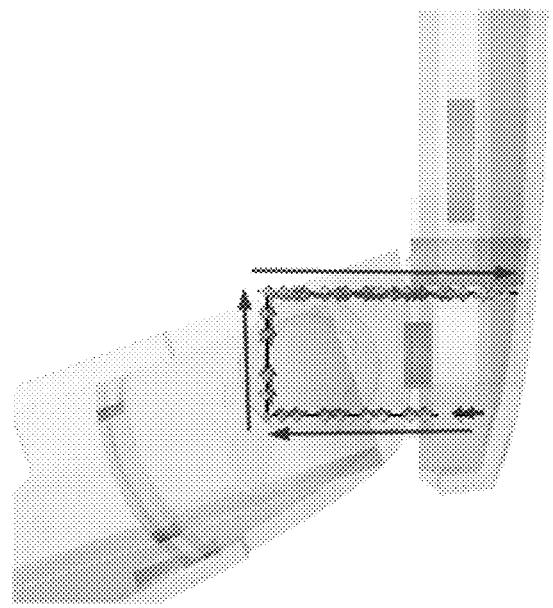
FIG. 20a is a schematic diagram (1) of a structure of partial current distribution of an antenna according to Embodiment 1 of this application, where an angle of view mainly shows a structure of the antenna in a length direction.
Figure 20B:
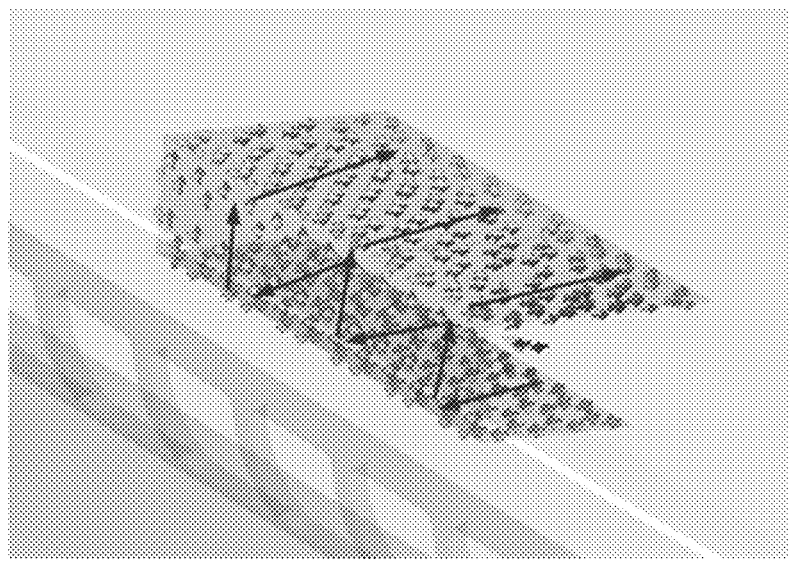
FIG. 20b is a schematic diagram (2) of a structure of partial current distribution of the antenna according to Embodiment 1 of this application, where an angle of view mainly shows a structure of the antenna in a width direction.

FIG. 19 is a schematic diagram of a structure of partial electric field distribution of an antenna. FIG. 20*a* and FIG. 20*b* are schematic diagrams of structures of partial current distribution of the antenna from different angles of view. The angle of view in FIG. 20*a* mainly shows a structure of the antenna in the length direction. The angle of view in FIG. 20*b* mainly shows a structure of the antenna in the width direction.

As shown in FIG. 19, the figure shows the electric field distribution of the antenna. The part with a dark color represents greater electric field strength. The electric field that flows toward the region where the second included angle is located (that is, the another region opposite to the opening/closing region) through the gap (the gap between one end of the horizontal segment of the second antenna segment and the ground plate (that is, the housing A); a radiation port of the antenna is mainly the gap between the antenna and the ground plate, and the electric field radiates outward through the gap) has the greatest strength (referring to a dashed box part in FIG. 19). The electric field that flows toward the region in which the second included angle is located from the horizontal segment of the second antenna segment has the second greatest strength. Therefore, strength of the antenna radiation toward the region in which the second included angle is located is the largest. In this way, the radiation pattern of the antenna faces toward the region in which the second included angle is located, and the electric field that is excited in the slot after the antenna is placed in the slot radiates toward the region in which the first included angle α1 is located. Therefore, the whole radiation pattern of the antenna is relatively uniform, showing that radiation faces toward both the region where the first included angle α1 is located and the region where the second included angle is located. Therefore, the directivity decreases.

As shown in FIG. 20*a* and FIG. 20*b*, current distribution of only the antenna is provided. Arrows in the figures respectively represent a current flow direction on the horizontal segment of the second antenna segment, a current flow direction on the vertical segment of the second antenna segment, and a current flow direction on the first antenna segment. It can be learned from FIG. 20*a* and FIG. 20*b* that current distribution on the whole antenna flows from a feed position (that is, near the gap) toward a grounding direction through the horizontal and vertical segments of, the second antenna segment and the first antenna segment in sequence.

Embodiment 2

Figure 21:
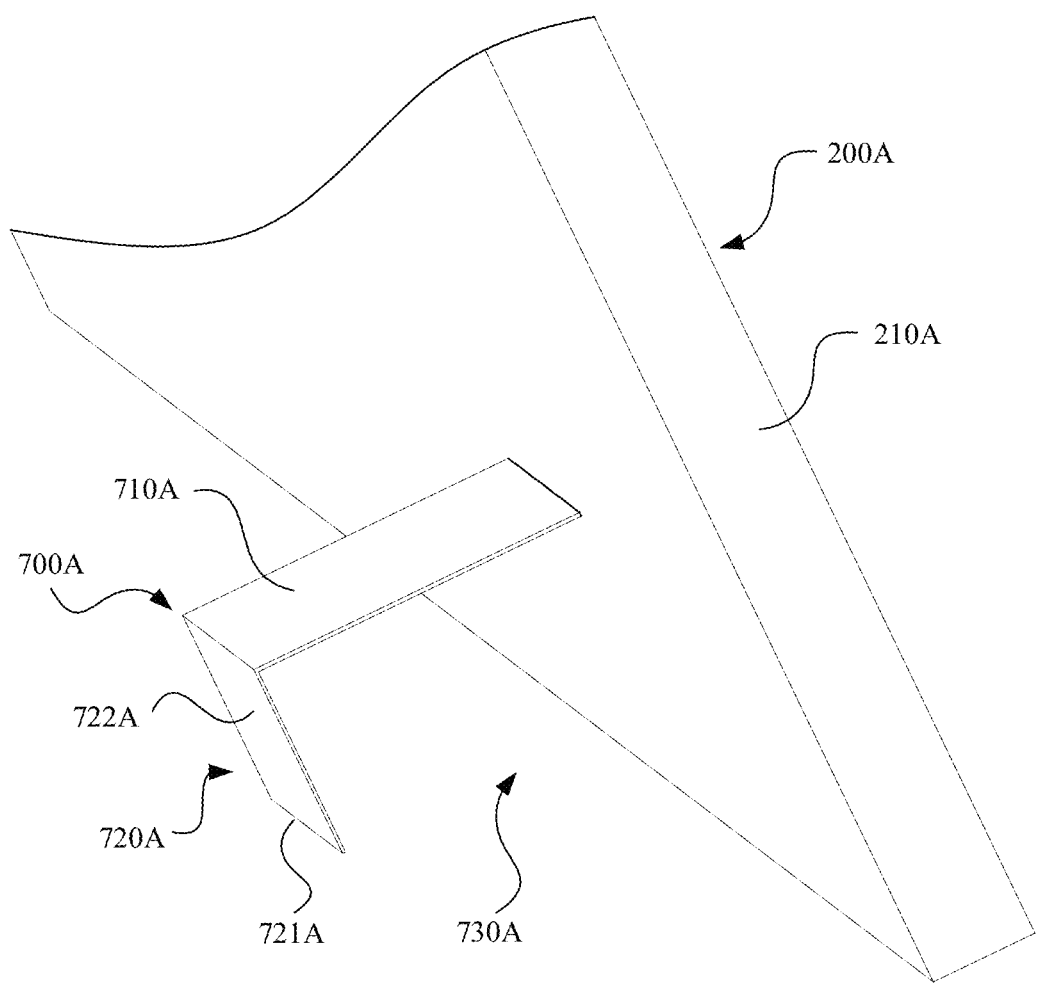
FIG. 21 is a schematic diagram of a partial structure of cooperation between an antenna and a first housing in a foldable electronic device according to Embodiment 2 of this application.
Figure 22:
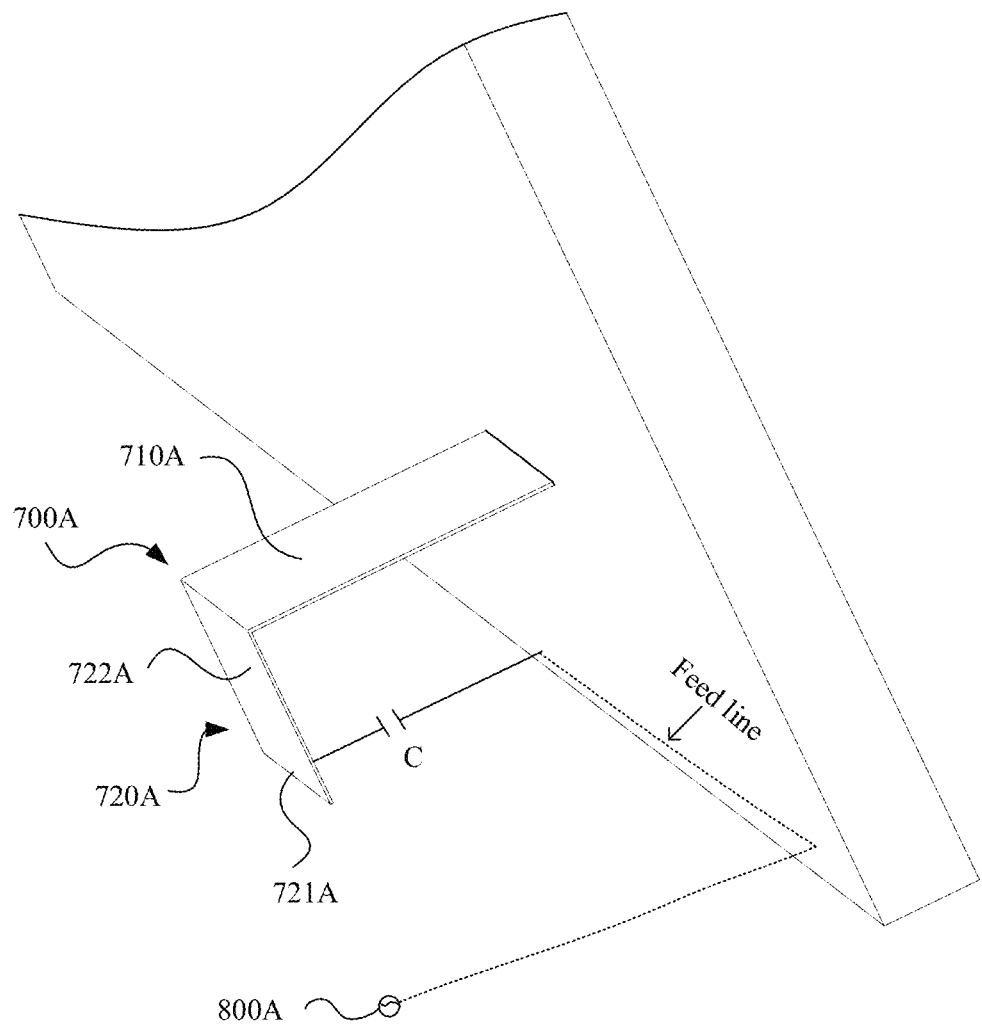
FIG. 22 is a schematic diagram of a structure of antenna feeding in an implementation according to Embodiment 2 of this application.
Figure 23:
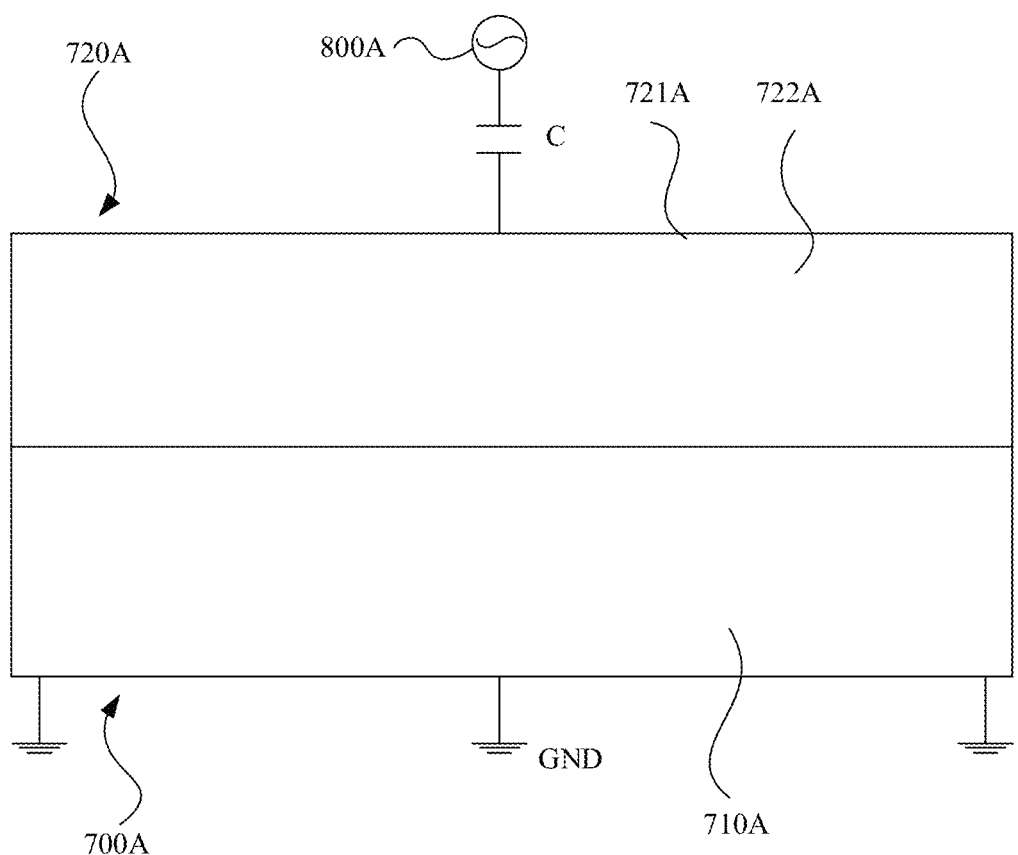
FIG. 23 is a schematic diagram of a circuit structure of antenna feeding in an unfolded state according to Embodiment 2 of this application.
Figure 24:
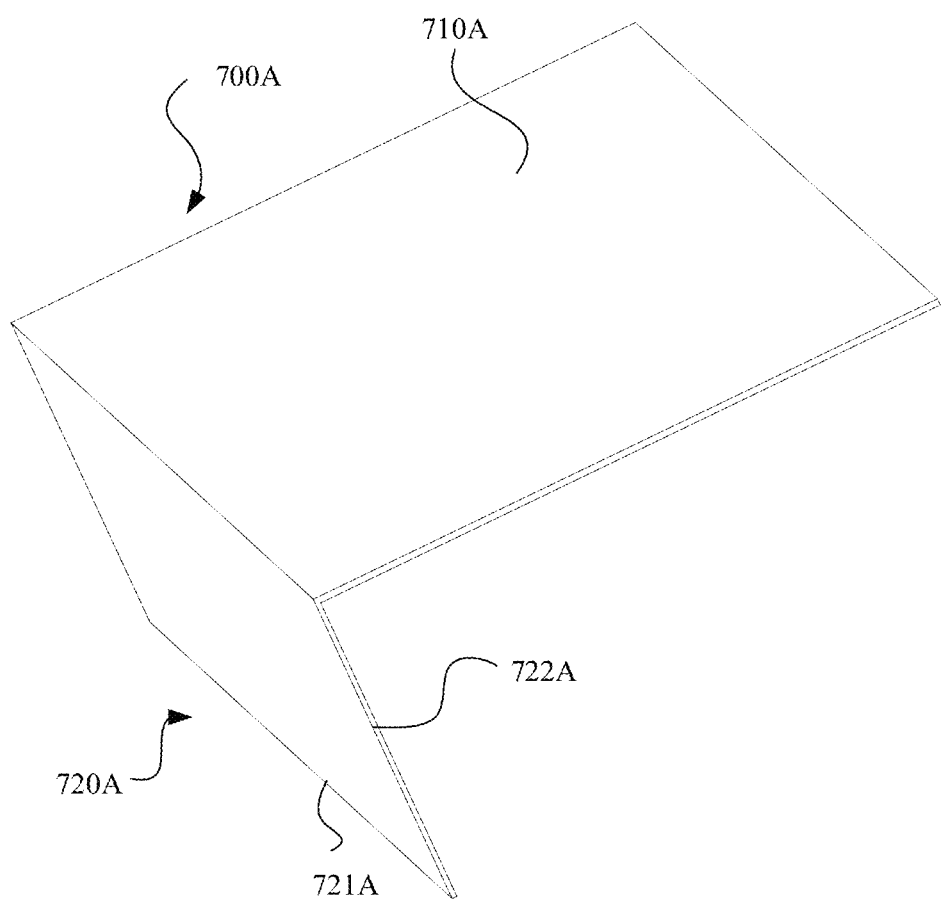
FIG. 24 is a schematic diagram (1) of a three-dimensional structure of an antenna according to Embodiment 2 of this application, where an angle of view mainly shows a structure of the antenna in a length direction.
Figure 25:
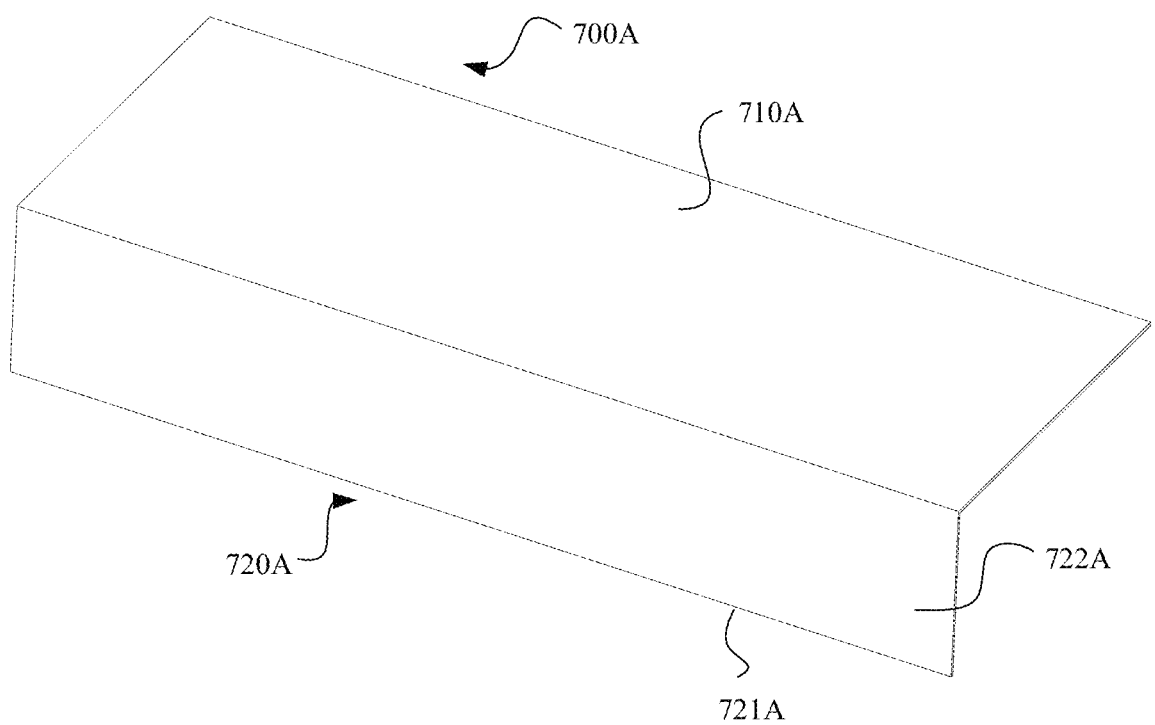
FIG. 25 is a schematic diagram (2) of a three-dimensional structure of the antenna according to Embodiment 2 of this application, where an angle of view mainly shows a structure of the antenna in a width direction.

FIG. 21 is a schematic diagram of a partial structure of cooperation between an antenna 700A and a first housing 200A in a foldable electronic device according to Embodiment 2 of this application. FIG. 22 is a schematic diagram of a structure of feeding of the antenna 700A in an implementation according to Embodiment 2 of this application. FIG. 23 is a schematic diagram of a circuit structure of feeding of the antenna 700A in an unfolded state according to Embodiment 2 of this application. FIG. 24 and FIG. 25 are schematic diagrams of a three-dimensional structure of the antenna 700A from different angles of view according to Embodiment 2 of this application. An angle of view in FIG. 24 mainly shows a structure of the antenna 700A in a length direction, and an angle of view in FIG. 25 mainly shows a structure of the antenna 700A in a width direction.

As shown in FIG. 21 to FIG. 25, compared with the structure of the antenna provided in Embodiment 1, the structure of the antenna 700A in this embodiment also includes a first antenna segment 710A and a second antenna segment 720A that are sequentially connected to each other along the length direction of the antenna 700A. A difference lies in that the second antenna segment 720A of the antenna 700A has a different structure. Specifically, the second antenna segment 720A includes only a vertical segment 722A, and a horizontal segment is removed. In this case, a gap 730A is formed between one end 721A of the vertical segment 722A of the second antenna segment 720A and a ground plate (that is, the housing A 210A) of the first housing 200A.

As shown in FIG. 22 to FIG. 23, a radio frequency signal output by a radio frequency module 800A is received by using the vertical segment 722A of the second antenna segment 720A, so that the antenna 700A radiates the signal outward. Specifically, that the vertical segment 722A of the second antenna segment 720A receives the radio frequency signal output by the radio frequency module 800A is implemented by connecting the end 721A of the vertical segment 722A to a capacitor C, and then connecting the capacitor C to the radio frequency module 800A to receive the radio frequency signal.

Certainly, a person skilled in the art may understand that, in another alternative implementation, excitation of the antenna may also be implemented by using distributed capacitor coupled feeding at one end of the vertical segment of the second antenna segment, or by disposing a metal column in the middle of the second antenna segment for direct feeding (that is, by inductive feeding).

It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. An antenna, comprising:
   a first antenna segment and a second antenna segment that are sequentially connected and disposed in a length direction of the antenna,
   wherein the antenna is for a foldable electronic device, the foldable electronic device comprises a first housing and a second housing, the first housing and the second housing are rotatably connected to each other by using a rotating shaft located between the first housing and the second housing so that the foldable electronic device switches between an unfolded state and a folded state, the first housing is of a first side on which a display screen of the foldable electronic device is located, the second housing is of a second side on which a keyboard of the foldable electronic device is located, the antenna is disposed in a space formed by a region surrounded by the first housing, the second housing, and the rotating shaft, and, when the foldable electronic device is in the unfolded state, an opening/closing region is formed between the first housing and the second housing wherein the first antenna segment includes a first end and a second end, the first end of the first antenna segment is connected to a ground plate of the first housing, and the first antenna segment extends toward the opening/closing region, from the first end of the first antenna segment to the second end of the first antenna segment; and the second antenna segment includes a third end and a fourth end, the third end of the second antenna segment is connected to the second end of the first antenna segment so that the second antenna segment, at the third end of the second antenna segment, is disposed at an angle to the first antenna segment at the second end of the first antenna segment, the fourth end of the second antenna segment is spaced apart from the ground plate of the first housing, the first antenna segment is entirely disposed away from a lower edge of the first housing relative to the second antenna segment entirely, the second antenna segment further comprises a feed part, and a radio frequency module of the foldable electronic device performs feeding on the feed part of the second antenna segment by using a feed line directly or by means of coupled feeding.

2. The antenna according to claim 1, wherein the second antenna segment is an L-shaped antenna segment and comprises a first section and a second section that intersect with each other, the first section of the L-shaped antenna segment is connected to the first antenna segment, and a fifth end of the second section of the L-shaped antenna segment is the fourth end of the second antenna segment.

3. The antenna according to claim 2, wherein the first section of the L-shaped antenna segment is disposed perpendicular to the first antenna segment, and the second section of the L-shaped antenna segment is disposed in parallel to the first antenna segment.

4. The antenna according to claim 2, wherein the second section of the L-shaped antenna segment is the feed part.

5. The antenna according to claim 4, wherein the fifth end of the second section of the L-shaped antenna segment is connected to a sixth end of a capacitor, and a seventh end of the capacitor is connected to the radio frequency module by using the feed line.

6. The antenna according to claim 4, wherein a notch is disposed at the fifth end of the second section of the L-shaped antenna segment, the antenna further comprises a feed branch, a main body of the feed branch is located in the notch, an isolation gap is formed between the main body of the feed branch and the second section, a part of the feed branch, other than the main body, is located outside the notch, and the part of the feed branch that is located outside the notch is connected to the radio frequency module by using the feed line and is coupled to the second section of the L-shaped antenna segment for the feeding by using the isolation gap.

7. The antenna according to claim 4, wherein a metal column is connected to a surface of the second section of the L-shaped antenna segment and that is disposed opposite to the first antenna segment, and a free end of the metal column is connected to the radio frequency module by using the feed line.

8. The antenna according to claim 1, wherein the first antenna segment and the second antenna segment of the antenna are formed by a bending metal sheet.

9. The antenna according to claim 1, wherein the first antenna segment is a sheet-shaped antenna segment, and the second antenna segment is an L-shaped and sheet-shaped antenna segment.

10. The antenna according to claim 9, wherein a second width of the second antenna segment is less than or equal to a first width of the first antenna segment.

11. The antenna according to claim 10, wherein based on that the second width of the second antenna segment is less than the first width of the first antenna segment, the second antenna segment is located in a middle of the first antenna segment in a width direction of the antenna, or based on that the second width of the second antenna segment is equal to the first width of the first antenna segment, the second antenna segment is flush with the first antenna segment in the width direction of the antenna.

12. The antenna according to claim 11, wherein there is a gap between the fourth end of the second antenna segment and the ground plate of the first housing, the antenna is of a three-dimensional structure, the first antenna segment, the second antenna segment, and the first housing surround the region to form a cavity, and the cavity communicates with the gap.

13. An antenna, comprising:

a first antenna segment and a second antenna segment that are sequentially connected and disposed along a length direction of the antenna, wherein the antenna is for a foldable electronic device, the foldable electronic device comprises a first housing and a second housing, the first housing and the second housing are rotatably connected to each other by using a rotating shaft located between the first housing and the second housing so that the foldable electronic device switches between an unfolded state and a folded state, the antenna is disposed in a space formed by a region surrounded by the first housing, the second housing, and the rotating shaft, and, when the foldable electronic device is in the unfolded state, the first housing is located above the second housing, and an opening/closing region is formed between the first housing and the second housing, wherein, when the foldable electronic device is in the unfolded state, the second antenna segment is located below the first antenna segment, wherein the antenna is of a three-dimensional structure, wherein the first antenna segment includes a first end and a second end, the first end of the first antenna segment is connected to a ground plate of the first housing, and the first antenna segment extends toward the opening/closing region, from the first end of the first antenna segment to the second end of the first antenna segment; and the second antenna segment includes a third end and a fourth end, the third end of the second antenna segment is connected to the second end of the first antenna segment so that the second antenna segment, at the third end of the second antenna segment, is disposed at an angle to the first antenna segment at the second end of the first antenna segment, the fourth end of the second antenna segment is spaced apart from the ground plate of the first housing, the second antenna segment further comprises a feed part, and a radio frequency module of the foldable electronic device directly performs feeding on the feed part of the second antenna segment by using a feed line directly or by means of coupled feeding.

14. A foldable electronic device, comprising a first housing and a second housing,
- wherein the first housing and the second housing are rotatably connected to each other by using a rotating shaft located between the first housing and the second housing so that the foldable electronic device switches between an unfolded state and a folded state, the first housing is of a first side on which a display screen of the foldable electronic device is located, and the second housing is a second side on which a keyboard of the foldable electronic device is located,
- wherein the foldable electronic device further comprises an antenna disposed in a space formed by a region surrounded by the first housing, the second housing, and the rotating shaft, and, when the foldable electronic device is in the unfolded state, an opening/closing region is formed between the first housing and the second housing,
- wherein the antenna comprises a first antenna segment and a second antenna segment that are sequentially connected and disposed in a length direction of the antenna,
- wherein the first antenna segment includes a first end and a second end, the first end of the first antenna segment is connected to a ground plate of the first housing, and the first antenna segment extends toward the opening/closing region, from the first end of the first antenna segment to the second end of the first antenna segment; and
- the second antenna segment includes a third end and a fourth end, the third end of the second antenna segment is connected to the second end of the first antenna segment so that the second antenna segment, at the third end of the second antenna segment, is disposed at an angle to the first antenna segment at the second end of the first antenna segment, the fourth end of the second antenna segment is spaced apart from the ground plate of the first housing, the first antenna segment is entirely disposed away from a lower edge of the first housing relative to the second antenna segment entirely, the second antenna segment further comprises a feed part, and a radio frequency module of the foldable electronic device performs feeding on the feed part of the second antenna segment by using a feed line directly or by means of coupled feeding.

15. The foldable electronic device according to claim 14, wherein the second antenna segment is an L-shaped antenna segment and comprises a first section and a second section that intersect with each other, the first section of the L-shaped antenna segment is connected to the first antenna segment, and a fifth end of the second section of the L-shaped antenna segment is the fourth end of the second antenna segment.

16. The foldable electronic device according to claim 15, wherein the first section of the L-shaped antenna segment is disposed perpendicular to the first antenna segment, and the second section of the L-shaped antenna segment is disposed in parallel to the first antenna segment.

17. The foldable electronic device according to claim 15, wherein the second section of the L-shaped antenna segment is the feed part.

18. The foldable electronic device according to claim 17, wherein the fifth end of the second section of the L-shaped antenna segment is connected to a sixth end of a capacitor, and a seventh end of the capacitor is connected to the radio frequency module by using the feed line.

19. The foldable electronic device according to claim 17, wherein a notch is disposed at the fifth end of the second section of the L-shaped antenna segment, the antenna further comprises a feed branch, a main body of the feed branch is located in the notch, an isolation gap is formed between the main body of the feed branch and the second section, a part of the feed branch, other than the main body, is located outside the notch, and the part of the feed branch that is located outside the notch is connected to the radio frequency module by using the feed line and is coupled to the second section of the L-shaped antenna segment for the feeding by using the isolation gap.

20. The foldable electronic device according to claim 14, wherein the foldable electronic device is a foldable notebook computer.

* * * * *